US012809123B2

(12) United States Patent
Kimura

(10) Patent No.: US 12,809,123 B2
(45) Date of Patent: Nov. 24, 2026

(54) OPTICAL SYSTEM AND IMAGE PICKUP APPARATUS

(71) Applicant: CANON KABUSHIKI KAISHA, Tokyo (JP)

(72) Inventor: Kohei Kimura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 184 days.

(21) Appl. No.: 18/981,757

(22) Filed: Dec. 16, 2024

(65) Prior Publication Data

US 2025/0258357 A1 Aug. 14, 2025

(30) Foreign Application Priority Data

Feb. 14, 2024 (JP) ................................ 2024-019976

(51) Int. Cl.
*G02B 9/12* (2006.01)
*G02B 9/64* (2006.01)

(52) U.S. Cl.
CPC *G02B 9/64* (2013.01); *G02B 9/12* (2013.01)

(58) Field of Classification Search
None
See application file for complete search history.

(56) References Cited

U.S. PATENT DOCUMENTS 8,934,046 B2 * 1/2015 Yamano ......... G02B 15/145121 348/335
10,215,972 B2 2/2019 Kimura
10,222,594 B2 3/2019 Kimura
10,670,834 B2 6/2020 Kimura
11,314,064 B2 4/2022 Kimura
11,435,563 B2 9/2022 Kimura
11,835,698 B2 12/2023 Kimura
12,099,171 B2 9/2024 Kimura
2020/0116985 A1 * 4/2020 Suzuki .................. G02B 13/02
2020/0233191 A1 * 7/2020 Ichimura ............ G02B 15/1461
2021/0349293 A1 * 11/2021 Uehara .............. G02B 15/1441
2022/0163778 A1 * 5/2022 Hirakawa ................ G02B 9/62
2022/0365320 A1 11/2022 Kimura
2023/0375802 A1 * 11/2023 Kuribayashi ............ G02B 9/34
2024/0019671 A1 1/2024 Kimura
2024/0053582 A1 * 2/2024 Machida .................. G02B 9/34
2025/0264697 A1 * 8/2025 Kitahara ................ G02B 13/18
2026/0086320 A1 * 3/2026 Ono ......................... G02B 9/60

FOREIGN PATENT DOCUMENTS

WO 2020/217791 W 10/2020

* cited by examiner

*Primary Examiner* — Darryl J Collins

(74) *Attorney, Agent, or Firm* — Carter, DeLuca & Farrell LLP

(57) ABSTRACT

An optical system includes, in order from an object side to an image side, a front lens unit having positive refractive power, an intermediate group, and a rear lens unit. A distance between adjacent lens units changes during focusing. The front lens unit includes a maximum air gap in the optical system. The front lens unit and the rear lens unit do not move for focusing. The intermediate group includes two or more focus lens units that move in different loci for focusing. Predetermined inequalities are satisfied.

16 Claims, 13 Drawing Sheets

OPTICAL SYSTEM AND IMAGE PICKUP APPARATUS

BACKGROUND

Technical Field

The present disclosure relates to an optical system for imaging.

Description of Related Art

Imaging optical systems with long focal lengths include a so-called telephoto type in which a lens unit with positive refractive power is disposed closest to an object and a lens unit with negative refractive power is disposed on the image side of it, and PCT International Publication WO 2020/217791 discloses a single-focus super telephoto lens.

PCT International Publication WO 2020/217791 discloses a super telephoto lens that includes, in order from the object side to the image side, a first lens unit with positive refractive power, a second lens unit with positive refractive power that moves during focusing, and a third lens unit with negative refractive power as a whole.

SUMMARY

An optical system according to one aspect of the disclosure includes, in order from an object side to an image side, a front lens unit having positive refractive power, an intermediate group, and a rear lens unit. A distance between adjacent lens units changes during focusing. The front lens unit includes a maximum air gap in the optical system. The front lens unit and the rear lens unit do not move for focusing. The intermediate group includes two or more focus lens units that move in different loci for focusing. The following inequalities are satisfied:

$$0.10 \leq \text{Bab\_min}/Fno \leq 0.95$$

$$0.45 \leq OTL/f \leq 1.20$$

where Bab_min is a smallest absolute value of focus sensitivity of the two or more focus lens units, Fno is a full aperture F-number of the optical system, OTL is a length on an optical axis from a lens surface closest to an object of the optical system to an image plane, and f is a focal length of the optical system. An image pickup apparatus having the above optical system also constitutes another aspect of the disclosure.

Further features of various embodiments of the disclosure will become apparent from the following description of embodiments with reference to the attached drawings.

DETAILED DESCRIPTION

Figure 1:
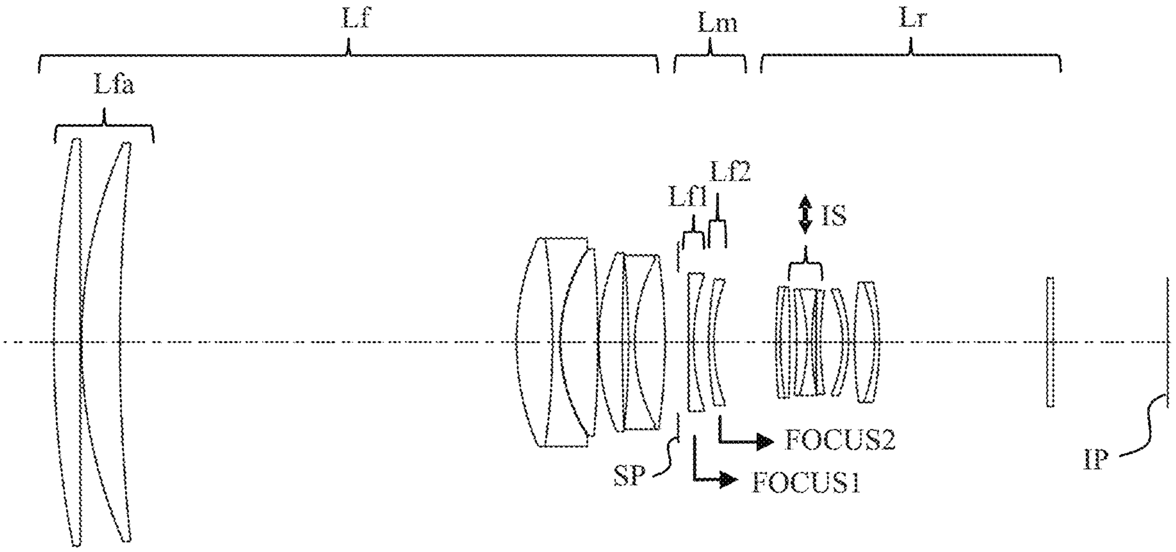
FIG. 1 illustrates a sectional view of an optical system according to Example 1.
Figure 2A:
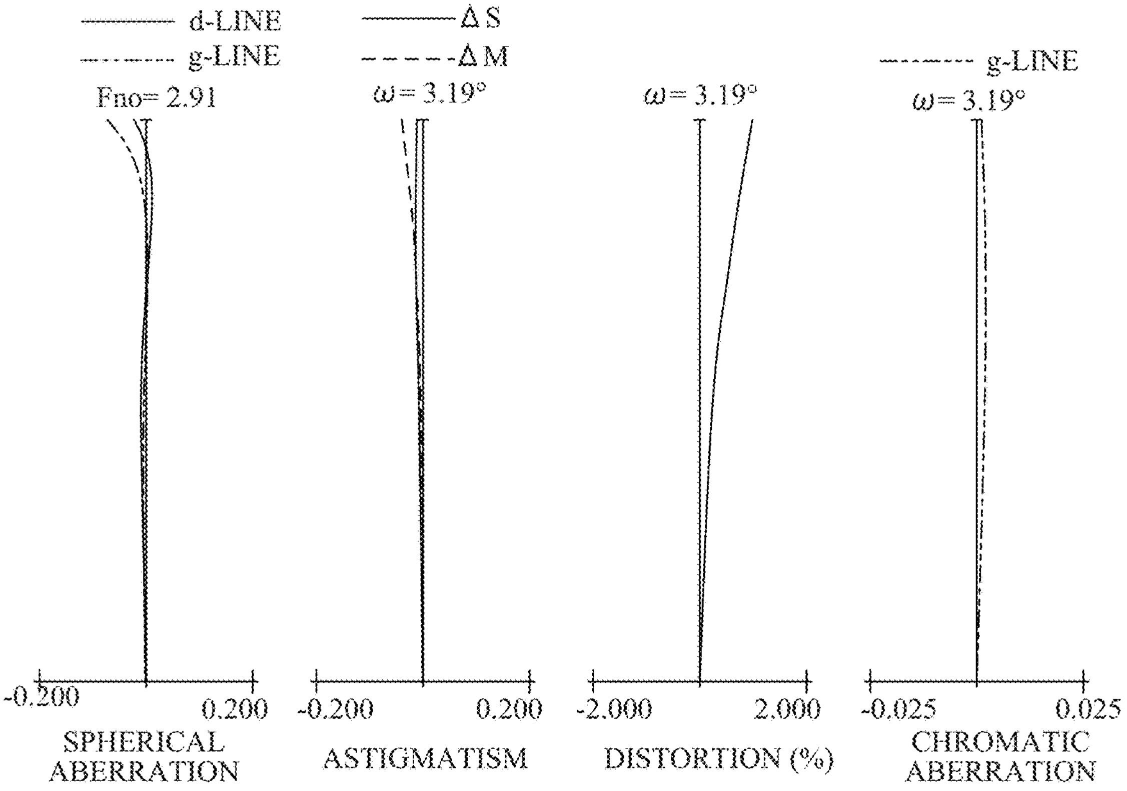
FIG. 2A illustrates an aberration diagram of the optical system according to Example 1 in an in-focus state at infinity.
Figure 2B:
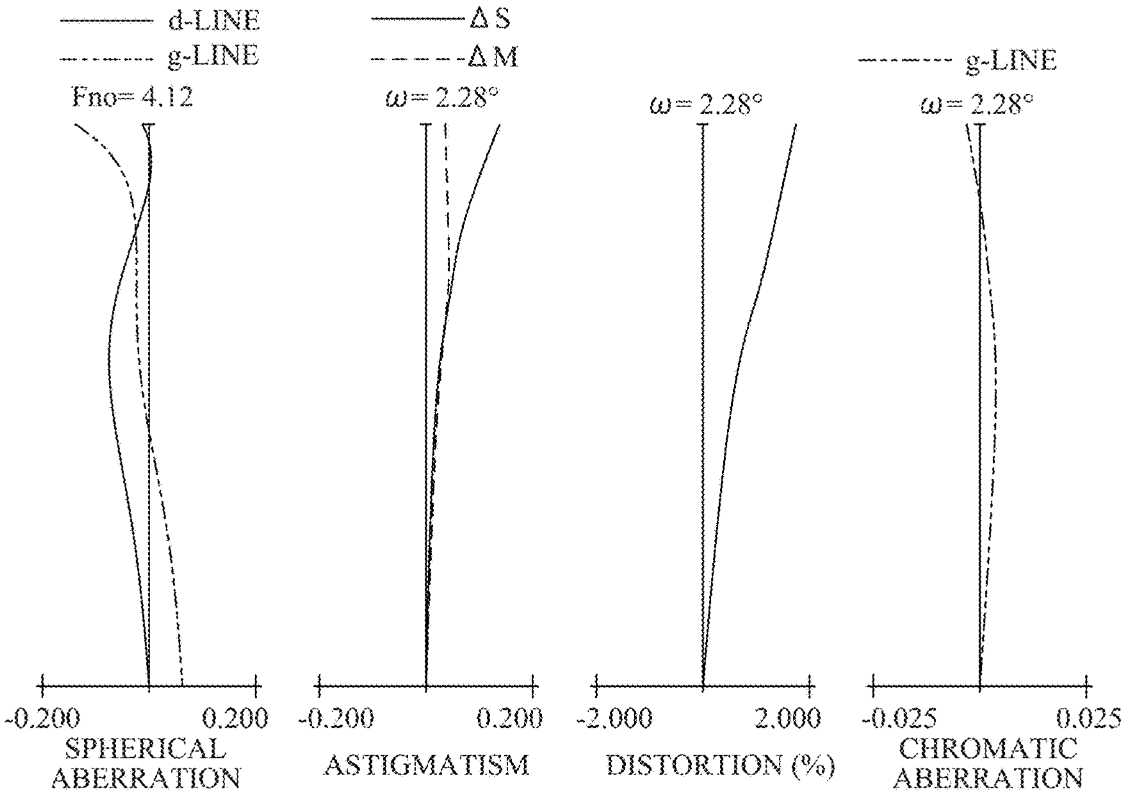
FIG. 2B illustrates an aberration diagram of the optical system according to Example 1 in an in-focus state at a close distance.

Each example will now be described with reference to the drawings. Prior to a detailed description of each of Examples 1 to 6, matters common to each example will be described. An optical system according to each example is used as an imaging optical system for various image pickup apparatuses such as video cameras, digital still cameras, silver film cameras, television cameras, security cameras, and on-board (in-vehicle) cameras.

FIGS. 1, 3, 5, 7, 9, and 11 illustrate the configurations of the optical systems according to Examples 1 to 6, respectively. In each figure, a left side is an object side (front side), and a right side is an image side (rear side).

The optical system according to each example includes, in order from the object side to the image side, a front lens unit Lf with positive refractive power that does not move during focusing, an intermediate group Lm including a focus lens unit that moves during focusing, and a rear lens unit Lr that does not move during focusing. A lens unit is a group of one or more lenses that may or may not move during focusing. In other words, a distance between adjacent lens units changes during focusing.

The front lens unit Lf has the largest air gap in the optical system. Lfa is an object-side lens subunit among lens subunits disposed on the object side and image side in the front lens unit Lf via the maximum air gap.

The intermediate group Lm includes two or more focus lens units Lfn (n=1 to 3 counted from the object side) that move independently of each other. That the focus lens units move independently of each other means that their moving directions and moving amounts are different from each other during focusing from infinity to a close distance. In each figure, an arrow (FOCUSn) below the focus lens unit indicates a moving direction of that focus lens unit during focusing from infinity to a close distance. The intermediate group Lm may include a lens unit that does not move during focusing in addition to the focus lens units.

SP represents an aperture stop (diaphragm) that determines an F-number of the optical system. IP represents an image plane. An imaging surface (light receiving surface) of an image sensor such as a CCD sensor or a CMOS sensor or a film surface (photosensitive surface) is disposed on the image plane IP. IS represents an image stabilizing lens unit. For optical image stabilization to correct image blur caused by camera shake, the image stabilizing lens unit IS is shifted relative to the optical axis.

In each example, two or more focus lens units Lfn are provided in the intermediate group Lm, and they move by different amounts during focusing to each object distance. This configuration can suppress an increase in various aberrations, particularly the increase in spherical aberration and coma, during close-range imaging. A shift amount from the desired focus position when one focus lens unit moves is corrected by moving (feedback control) another focus lens unit. This configuration can provide high-speed and highly accurate focusing that is difficult to achieve with a single focus lens unit.

In particular, it is effective to first move one of the two or more focus lens units that has a higher absolute value of focus sensitivity, and then move the other focus lens unit that has a lower absolute value of focus sensitivity as an auxiliary unit to correct a focus shift that occurs at that time. The focus sensitivity is a ratio of a moving amount of the focus lens unit to a moving amount of the image plane, and will be described in detail later. Thereby, in a case where the refractive power arrangement of the entire optical system, particularly the telephoto arrangement in a telephoto lens, is increased to reduce the overall length, this configuration can suppress a decrease in focus accuracy and an increase in aberration during focusing even if the refractive power of the focus lens unit is increased.

The optical system according to each example may satisfy the following inequality (1):

$$0.10 \leq \text{Bab\_min}/Fno \leq 0.95 \quad (1)$$

where Bab_min is the smallest absolute value of focus sensitivity of each of two or more focus lens units Lfn, and Fno is a full aperture F-number of the optical system.

Focus sensitivity B is defined by the following inequality (A) using the lateral magnification Bf of the focus lens unit and the combined lateral magnification Br of the lenses disposed on the image side of the focus lens unit:

$$B = (1 - \beta f^2)\beta r^2 \quad (A)$$

Inequality (1) defines a proper relationship between the focus sensitivity of the focus lens unit with the lowest focus sensitivity and the full aperture F-number for high-speed and highly accurate focusing. In a case where Bab_min increases so that Bab_min/Fno becomes higher than the upper limit of inequality (1), a focus shift caused by a stop position error of the focus lens unit during focusing becomes a nonnegligible amount. In a case where Fno reduces so that Bab_min/Fno becomes higher than the upper limit of inequality (1), the diameter of the front lens unit increases and it becomes difficult to reduce the size and weight of the optical system.

In a case where Bab_min reduces so that Bab_min/Fno becomes lower than the lower limit of inequality (1), it is beneficial to correct the focus shift caused by the movement of one focus lens unit using the other focus lens unit, as described above. However, a moving amount of the other focus lens unit increases, and the overall length of the optical system increases. In a case where Fno increases so that Bab_min/Fno becomes lower than the lower limit of inequality (1), it becomes difficult to obtain an optical system with the desired diameter, and the deterioration of optical performance due to diffraction becomes significant.

Satisfying the above configuration and inequality can achieve an optical system that has a reduced size and weight, a long focal length, the capability of high-speed and highly accurate focusing, and various well-corrected aberrations.

The optical system according to each example may satisfy at least one of the following inequalities (2) to (10):

$$0.45 \leq OTL/f \leq 1.20 \quad (2)$$

$$0.06 \leq \text{fab\_min}/f \leq 0.60 \quad (3)$$

$$0.1 \leq \text{fab\_max}/f \leq 2.0 \quad (4)$$

$$0.15 \leq D\text{max}/OTL \leq 0.60 \quad (5)$$

$$0.2 \leq f1/f \leq 0.8 \quad (6)$$

$$0.01 \leq \text{Df\_max}/OTL \leq 0.15 \quad (7)$$

$$1.3 \leq BF/IH \leq 5.0 \quad (8)$$

$$0.5 \leq \text{Bab\_max}/Fno \leq 2.0 \quad (9)$$

$$0.2 \leq f1a/f \leq 1.0 \quad (10)$$

In inequalities (2) to (10), OTL is a length on the optical axis from a lens surface closest to an object of the optical system to the image plane (overall optical length), and f is a focal length of the entire optical system. fab_min is the smallest absolute value of focal lengths of two or more focus lens units, and fab_max is the largest absolute value of the focal lengths of two or more focus lens units.

In each example, the front lens unit Lf has the largest air gap in the entire optical system. Since the front lens unit Lf has the highest mass in the optical system, it is effective in terms of weight reduction to reduce the number of lenses disposed on the object side as much as possible. Dmax is a length on the optical axis of the maximum air gap in the front lens unit Lf in an in-focus state on an object at infinity (referred to as "in an in-focus state at infinity" hereinafter). f1 is a focal length of the front lens unit Lf.

Df_max is a distance on the optical axis from the aperture stop to an aperture-stop-side lens surface of the focus lens unit that is farthest from the aperture stop among the two or more focus lens units. BF is an air-equivalent distance on the optical axis from a lens surface closest to the image plane of the optical system to the image plane (back focus). IH is a maximum image height, and Bab_max is the largest absolute value of the focus sensitivity of the two or more focus lens units. f1a is a focal length of the object-side lens subunit Lfa.

Inequality (2) defines a proper range of the ratio (telephoto ratio) of the overall optical length OTL to the focal length f in order to reduce the overall length of the optical system and suppress various aberrations. In a case where the overall optical length OTL increases so that OTL/f becomes higher than the upper limit of inequality (2), the overall length increases, and it becomes difficult to reduce the size of the optical system. In a case where the focal length f reduces so that OTL/f becomes higher than the upper limit of inequality (2), an optical system with a proper telephoto focal length cannot be obtained. On the other hand, in a case where the overall optical length OTL reduces so that OTL/f becomes lower than the lower limit of inequality (2), it is good from the viewpoint of reducing the overall length, but the telephoto refractive power arrangement is enhanced and various aberrations, particularly spherical aberration, chromatic aberration, and curvature of field, increase. In a case where the focal length f increases so that OTL/f becomes lower than the lower limit of inequality (2), it becomes difficult to sufficiently correct chromatic aberration while the weight of the optical system is reduced.

Inequality (3) defines a proper relationship between the absolute value fab_min of the smallest focal length of the two or more focus lens units and the focal length f of the optical system for good aberration correction even in close-range imaging. In a case where the minimum focal length fab_min of the focus lens unit reduces so that fab_min/f becomes higher than the upper limit of inequality (3), the refractive power of the focus lens unit increases and various aberrations, particularly spherical aberration and curvature of field, increase during focusing on an object at a close distance. In a case where the focal length f of the optical system reduces so that fab_min/f becomes higher than the upper limit of inequality (3), a proper telephoto focal length cannot be obtained. On the other hand, in a case where the minimum focal length fab_min of the focus lens unit increases so that fab_min/f becomes lower than the lower limit of inequality (3), various aberrations during focusing on an object at a close distance can be suppressed, but a moving amount of the focus lens unit increases, and the overall length of the optical system increases. In a case where the focal length f of the optical system increases so that fab_min/f becomes lower than the lower limit of inequality (3), it becomes difficult to sufficiently correct chromatic aberration while the weight of the optical system is reduced.

Inequality (4) defines a proper relationship between the absolute value fab_max of the largest focal length of two or more focus lens units and the focal length f of the optical system for good aberration correction in close-range imaging and a reduced overall length of the optical system. In a case where the maximum focal length fab_max of the focus lens unit increases so that fab_max/f becomes higher than the upper limit of inequality (4), it is beneficial to correct a focus shift that occurs when the other focus lens unit moves, but a moving amount of the focus lens unit with the maximum focal length increases during focusing, and it becomes difficult to shorten the overall length of the optical system. In a case where the focal length f of the optical system reduces so that fab_max/f becomes higher than the upper limit of inequality (4), a proper telephoto focal length cannot be obtained. On the other hand, in a case where the maximum focal length fab_max of the focus lens unit reduces so that fab_max/f becomes lower than the lower limit of inequality (4), the refractive power of the focus lens unit increases, and the spherical aberration and the curvature of field increase during focusing at a close distance. In a case where the focal length f of the optical system increases so that fab_max/f becomes lower than the lower limit of inequality (4), a proper telephoto focal length can be obtained, but it becomes difficult to perform good aberration correction while the size of the optical system is reduced.

Inequality (5) defines a proper relationship between the maximum air gap length Dmax in the front lens unit Lf and the overall optical length OTL in order to reduce both the weight and the overall length of the optical system. In a case where the maximum air gap length Dmax is increased so that Dmax/OTL becomes higher than the upper limit of inequality (5), the weight of the optical system can be reduced, but the on-axis ray height in an image-side lens subunit disposed adjacent to the maximum air gap reduces, and spherical aberration cannot be sufficiently corrected. In a case where the overall optical length OTL is reduced so that Dmax/OTL becomes higher than the upper limit of inequality (5), the overall length can be reduced, but the telephoto arrangement at the telephoto focal length is excessively enhanced, and it becomes difficult to suppress various aberrations, especially spherical aberration and curvature of field. In a case where the maximum air gap length Dmax reduces so that Dmax/OTL becomes lower than the lower limit of inequality (5), the lenses are integrally disposed at the part of the front lens unit Lf with a large diameter. Although this is beneficial to aberrational correction, it becomes difficult to reduce the weight of the optical system. In a case where the overall optical length OTL increases so that Dmax/OTL becomes lower than the lower limit of inequality (5), it becomes difficult to reduce the size of the optical system.

Inequality (6) defines a proper relationship between the focal length f1 of the front lens unit Lf and the focal length f of the optical system in order to achieve both size and weight reductions and aberrational correction. In a case where the focal length f1 of the front lens unit Lf increases so that f1/f becomes higher than the upper limit of inequality (6), it becomes difficult to reduce the overall length of the optical system since the telephoto arrangement cannot be enhanced. In a case where the focal length f of the optical system is reduced so that f1/f becomes higher than the upper limit of inequality (6), it becomes difficult to obtain a proper telephoto focal length. On the other hand, in a case where the focal length f1 of the front lens unit Lf is reduced so that f1/f becomes lower than the lower limit of inequality (6), this is beneficial to reduce the overall length, but it becomes difficult to sufficiently correct spherical aberration and coma generated in the front lens unit Lf using the subsequent lens units. In a case where the focal length f of the optical system is increased so that f1/f becomes lower than the lower limit of inequality (6), it becomes difficult to sufficiently correct chromatic aberration while the weight of the optical system is reduced.

Inequality (7) defines a proper relationship between the distance Df_max from the aperture stop SP to the focus lens unit that is farthest from the aperture stop SP among the two focus lens units, and the overall optical length OTL, in order to sufficiently correct aberrations during focusing from infinity to a close distance. In a case where the distance Df_max increases so that $|Df\_max|/OTL$ becomes higher than the upper limit of inequality (7), a distance from the aperture stop SP to the focus lens unit increases, and it becomes difficult to sufficiently suppress curvature of field during focusing to a close distance. In particular, in a case where the focus lens unit separates from the aperture stop SP toward the object side, it becomes difficult to reduce the weight of the focus lens unit. In a case where the overall optical length OTL reduces so that $|Df\_max|/OTL$ becomes higher than the upper limit of inequality (7), this is beneficial to reduce the overall length of the optical system, but it is difficult to sufficiently suppress spherical aberration and coma. On the other hand, in a case where the distance Df_max reduces so that |Df_max|/OTL becomes lower than the lower limit of inequality (7), two or more focus lens units are integrally disposed near the aperture stop SP, and it becomes difficult to secure the arrangement space. In a case where the overall optical length OTL increases so that |Df_max|/OTL becomes lower than the lower limit of inequality (7), it becomes difficult to reduce the overall length of the optical system.

Inequality (8) defines a proper relationship between the back focus BF and the maximum image height IH. In a case where BF/IH becomes higher than the upper limit of inequality (8), the overall length of the optical system increases, and the weight of the components such as the lens barrel that holds the optical system increases, and it becomes difficult to reduce the weight of the optical system. In a case where BF/IH becomes lower than the lower limit of inequality (8), the back focus reduces. In this case, the diameter of the lens (final lens) disposed closest to the image plane of the optical system increases, and the diameter of the mount for attaching the interchangeable optical system to the image pickup apparatus increases. As a result, it becomes difficult to reduce the sizes and weights of the optical system and the image pickup apparatus. On the other hand, in a case where the back focus is reduced to reduce the diameter of the final lens in the optical system so that BF/IH becomes lower than the lower limit of inequality (8), an incident angle of light on the image sensor in the image pickup apparatus increases. As a result, image quality is likely to deteriorate, particularly in the peripheral portion of the image.

Inequality (9) defines a proper relationship between the maximum value Bab_max among the absolute values of the focus sensitivity of the two or more focus lens units and the full aperture F-number Fno. In a case where Bab_max/Fno becomes higher than the upper limit of inequality (9), the focus shift due to the stop position error of the focus lens unit with the large Bab_max increases. As a result, even if the focus shift is corrected by the other focus unit, the correction takes time. In a case where Bab_max/Fno becomes lower than the lower limit of inequality (9), a long space for focusing must be secured in the optical axis direction, and it becomes difficult to reduce the overall length.

Inequality (10) defines a proper relationship between the focal length f1a of the object-side lens subunit Lfa in the front lens unit Lf and the focal length f of the optical system in order to reduce the overall length of the optical system and suppress aberrations. In a case where the focal length f1a of the object-side lens subunit increases so that f1a/f becomes higher than the upper limit of inequality (10), it becomes difficult to reduce the overall length of the optical system. In a case where the focal length f of the optical system reduces so that f1a/f becomes higher than the upper limit of inequality (10), it becomes difficult to obtain a proper telephoto focal length. On the other hand, in a case where the focal length f1a of the object-side lens subunit Lfa reduces so that f1a/f becomes lower than the lower limit of inequality (10), it becomes difficult to suppress spherical aberration and chromatic aberration generated in the object-side lens subunit Lfa using the subsequent lens units. In a case where the focal length f of the optical system increases so that f1a/f becomes lower than the lower limit of inequality (10), it becomes difficult to sufficiently correct chromatic aberration while the weight of the optical system is reduced.

Inequalities (1) to (10) may be replaced with inequalities (1a) to (10a) below:

$$0.20 \le Bab\_min/Fno \le 0.93 \quad (1a)$$

$$0.55 \le OTL/f \le 1.10 \quad (2a)$$

$$0.08 \le fab\_min/f \le 0.55 \quad (3a)$$

$$0.13 \le fab\_max/f \le 1.90 \quad (4a)$$

$$0.25 \le Dmax/OTL \le 0.60 \quad (5a)$$

$$0.25 \le f1/f \le 0.75 \quad (6a)$$

$$0.015 \le Df\_max/OTL \le 0.120 \quad (7a)$$

$$1.5 \le BF/IH \le 4.0 \quad (8a)$$

$$0.7 \le Bab\_max/Fno \le 1.9 \quad (9a)$$

$$0.30 \le f1a/f \le 0.95 \quad (10a)$$

Inequalities (1) to (10) may be replaced with inequalities (1b) to (10b) below:

$$0.22 \le Bab\_min/Fno \le 0.91 \quad (1b)$$

$$0.6 \le OTL/f \le 1.0 \quad (2b)$$

$$0.10 \le fab\_min/f \le 0.35 \quad (3b)$$

$$0.18 \le fab\_max/f \le 1.75 \quad (4b)$$

$$0.35 \le Dmax/OTL \le 0.55 \quad (5b)$$

$$0.31 \le f1/f \le 0.55 \quad (6b)$$

$$0.025 \le Df\_max/OTL \le 0.085 \quad (7b)$$

$$1.7 \le BF/IH \le 2.5 \quad (8b)$$

$$0.9 \le Bab\_max/Fno \le 1.8 \quad (9b)$$

$$0.40 \le f1a/f \le 0.88 \quad (10b)$$

In each example, in order to obtain good imaging performance (suppress aberration fluctuation) even during optical image stabilization, the image stabilizing lens unit IS may include three or more lenses including a positive lens and a negative lens. For a cemented lens in which n (two or more) lenses are cemented together, the number of lenses is counted as n.

In each example, the image stabilizing lens unit IS may include at least a part of the rear lens unit Lr that is disposed on the image side of the focus lens unit. Thereby, good optical image stabilization can be achieved with a small and lightweight image stabilizing lens unit.

In each example, the focus lens unit may be disposed on the image side of the aperture stop SP. In order to efficiently place the focus drive mechanisms that drives the focus lens units, all of the focus lens units may have negative refractive powers and move toward the image side during focusing from infinity to a close distance.

In order to reduce the weight of the optical system, in each example, the object-side lens subunit Lfa disposed on the object side of the maximum air gap in the front lens unit Lf may include a single positive lens.

Satisfying the above inequalities and configurations enables an optical system to have a long telephoto focal length, various well-corrected aberrations, and small and lightweight focus lens units.

A specific description will now be given of the optical system according to each example.

Example 1

An optical system according to Example 1 illustrated in FIG. 1 includes an intermediate group Lm disposed on the image side of an aperture stop SP. The intermediate group Lm includes two adjacent focus lens units Lf1 and Lf2, each of which has negative refractive power. During focusing from infinity to a close distance, the focus lens units Lf1 and Lf2 move toward the image side as illustrated by arrows in FIG. 1 so that a distance between them increases.

An object-side lens subunit Lfa in the front lens unit Lf includes two positive lenses.

An image stabilizing lens unit ISf, which is a lens subunit including the third to fifth lenses counted from the object side in the rear lens unit Lr, shifts relative to the optical axis for optical image stabilization.

Example 2

Figure 3:
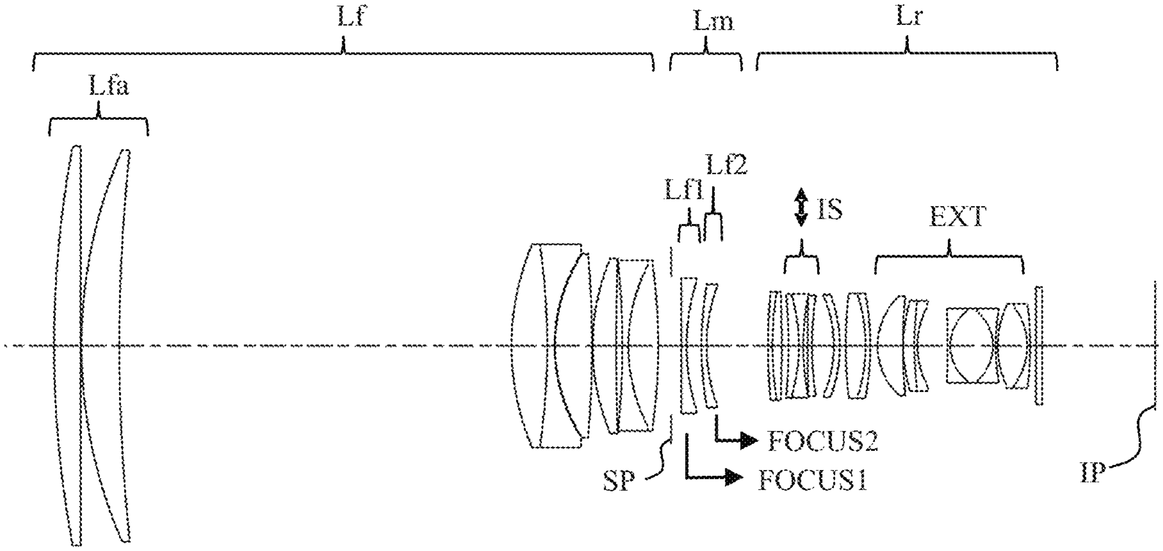
FIG. 3 illustrates a sectional view of an optical system according to Example 2.
Figure 4A:
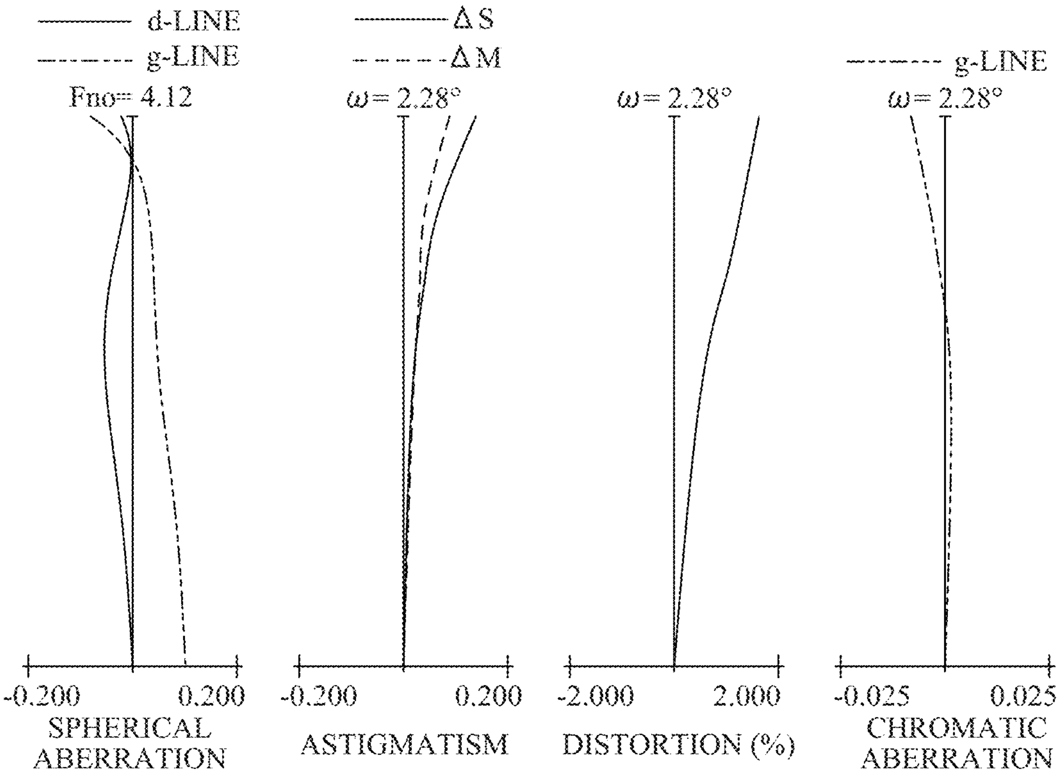
FIG. 4A illustrates an aberration diagram of the optical system according to Example 2 in an in-focus state at infinity.
Figure 4B:
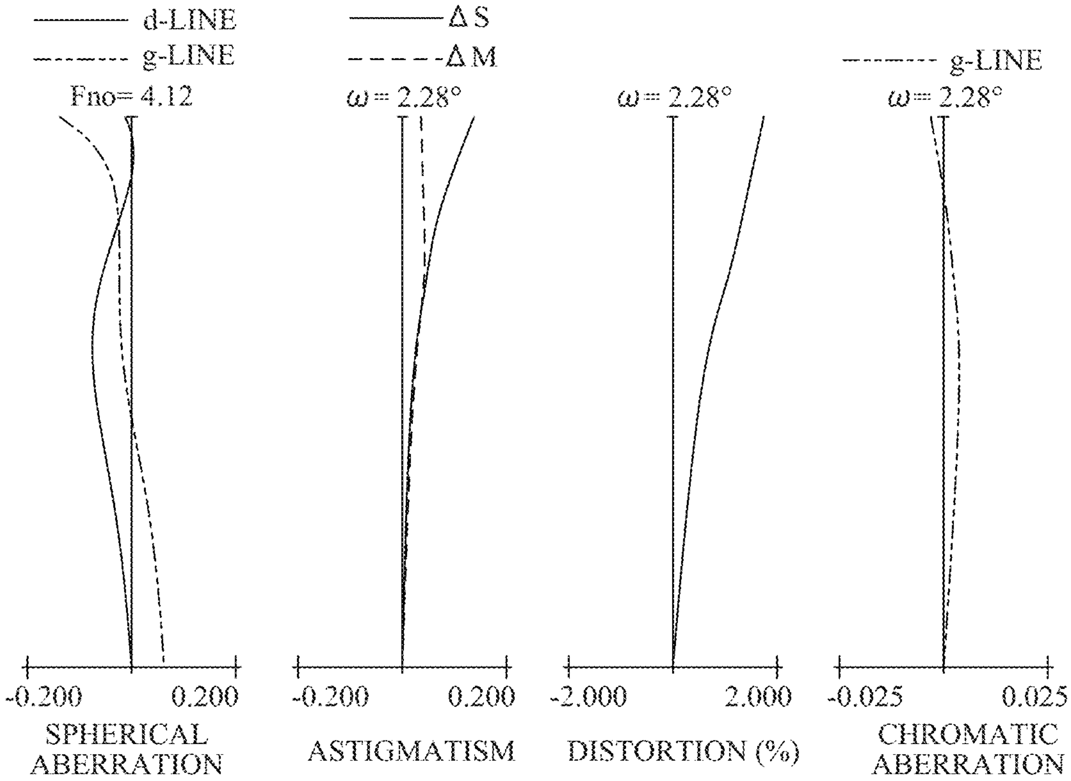
FIG. 4B illustrates an aberration diagram of the optical system according to Example 2 in an in-focus state at a close distance.

An optical system according to Example 2 illustrated in FIG. 3 has the same configuration as that of the optical system according to Example 1, except that a lens subunit EXT is inserted in the rear lens unit Lr.

The lens subunit EXT can be inserted and removed by an unillustrated insertion/removal mechanism into the space between the final lens in the rear lens unit Lr and a lens disposed just before and on the object side of it. The lens subunit EXT has negative refractive power and functions as an extender configured to increase a focal length of the optical system by approximately 1.4 times.

Example 3

Figure 5:
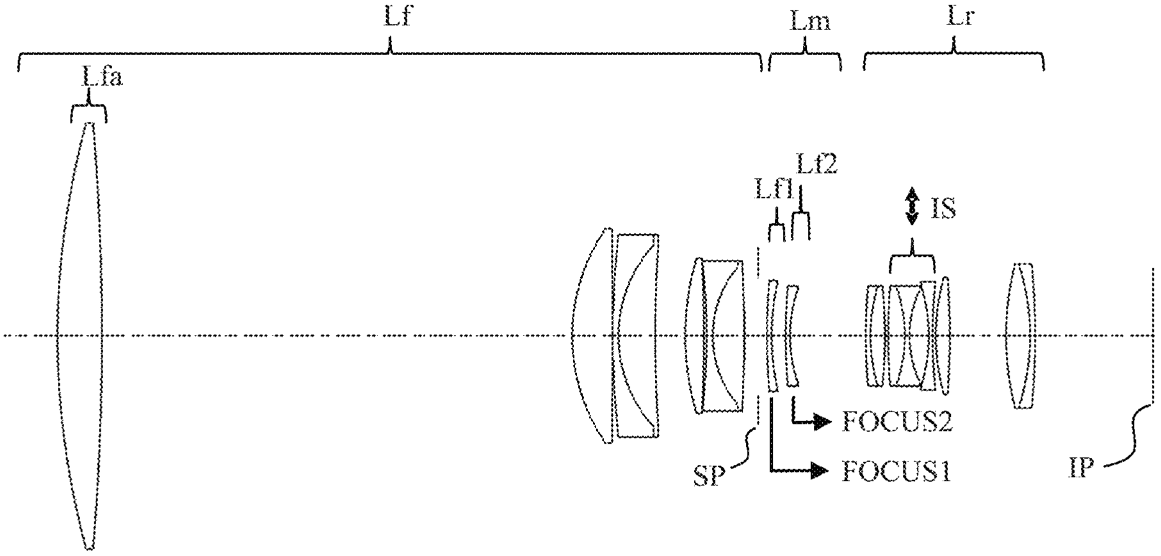
FIG. 5 illustrates a sectional view of an optical system according to Example 3.

An optical system according to Example 3 illustrated in FIG. 5 includes an intermediate group Lm disposed on the image side of an aperture stop SP. The intermediate group Lm includes two adjacent focus lens units Lf1 and Lf2, each of which has negative refractive power. During focusing from infinity to a close distance, the focus lens units Lf1 and Lf2 move toward the image side as illustrated by arrows in FIG. 5 so that a distance between them is reduced.

In the front lens unit Lf, an object-side lens subunit Lfa includes a single positive lens whose object-side surface is aspheric.

In the rear lens unit Lr, an image stabilizing lens unit ISf, which is a lens subunit including the third to fifth lenses counted from the object side, shifts relative to the optical axis for optical image stabilization.

Example 4

Figure 7:
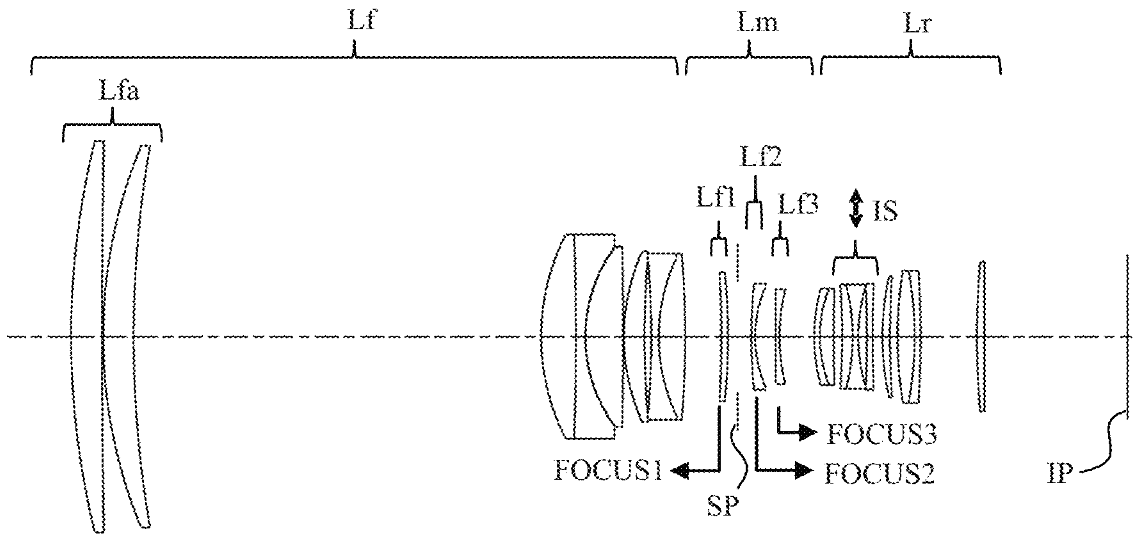
FIG. 7 illustrates a sectional view of an optical system according to Example 4.
Figure 8A:
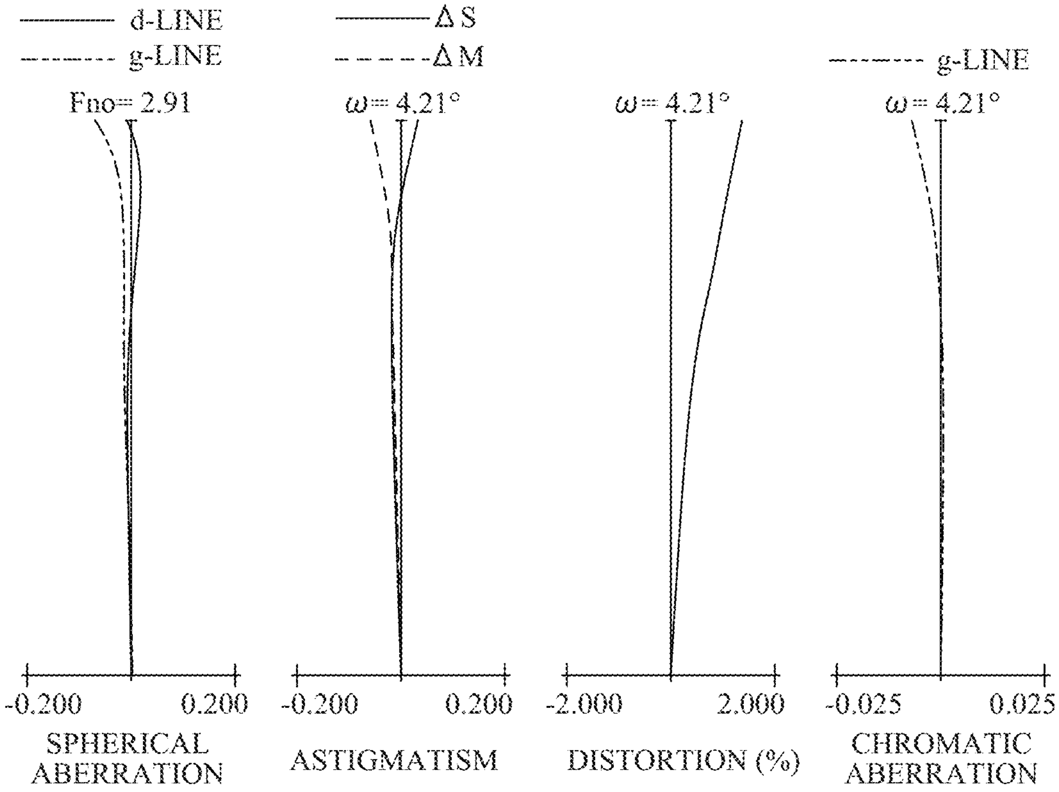
FIG. 8A illustrates an aberration diagram of the optical system according to Example 4 in an in-focus state at infinity.
Figure 8B:
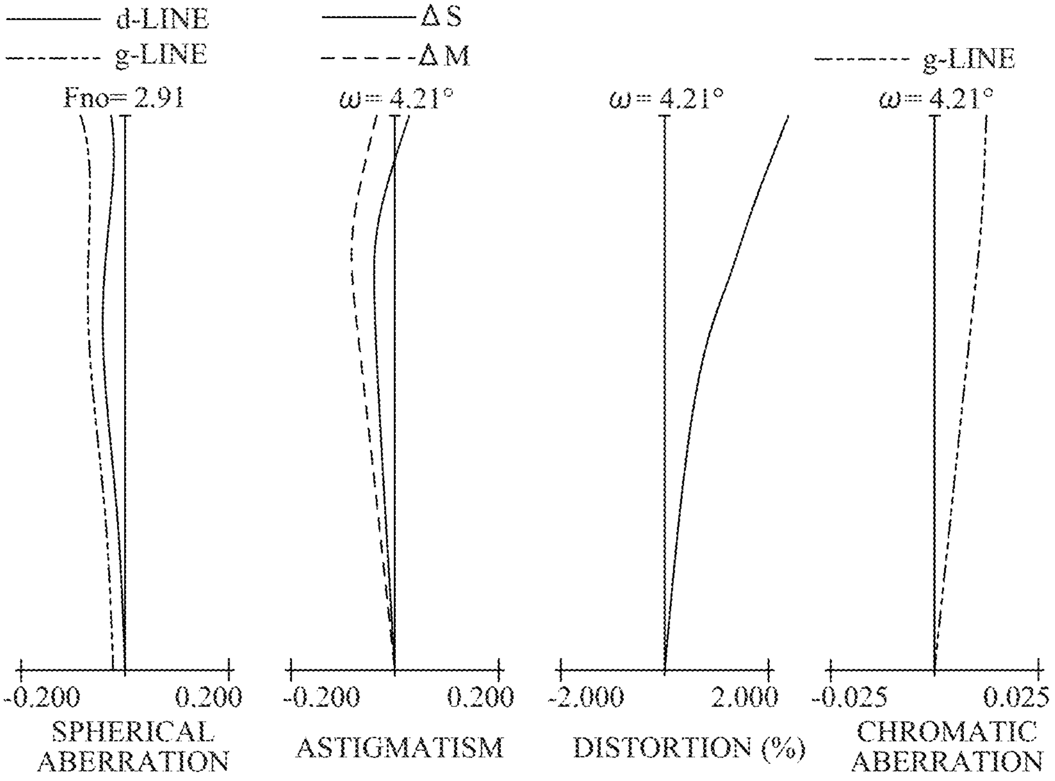
FIG. 8B illustrates an aberration diagram of the optical system according to Example 4 in an in-focus state at a close distance.

In an optical system according to Example 4 illustrated in FIG. 7, an intermediate group Lm includes, in order from the object side to the image side, a focus lens unit Lf1 with positive refractive power, an aperture stop SP, a focus lens unit Lf2 with negative refractive power, and a focus lens unit Lf3 with negative refractive power. During focusing from infinity to a close distance, the focus lens unit Lf1 moves toward the object side, and the focus lens units Lf2 and Lf3 move toward the image side so that a distance between them reduces. The aperture stop SP does not move during focusing.

An object-side lens subunit Lfa in the front lens unit Lf includes two positive lenses.

An image stabilizing lens unit ISf, which is a lens subunit including the third to fifth lenses counted from the object side in the rear lens unit Lr, shifts relative to the optical axis for optical image stabilization.

Example 5

Figure 9:
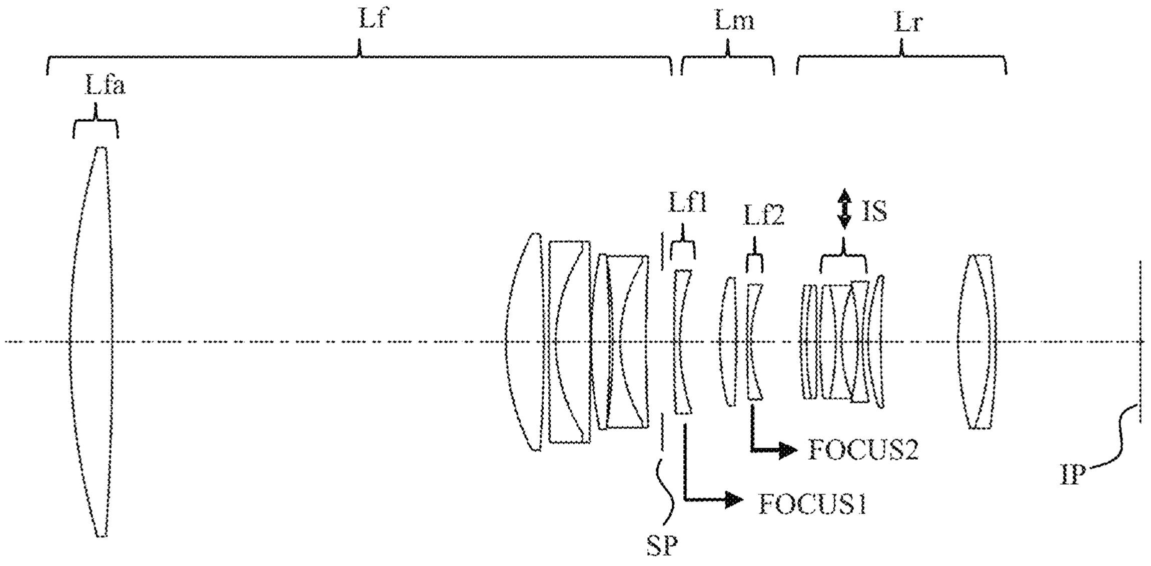
FIG. 9 illustrates a sectional view of an optical system according to Example 5.
Figure 10A:
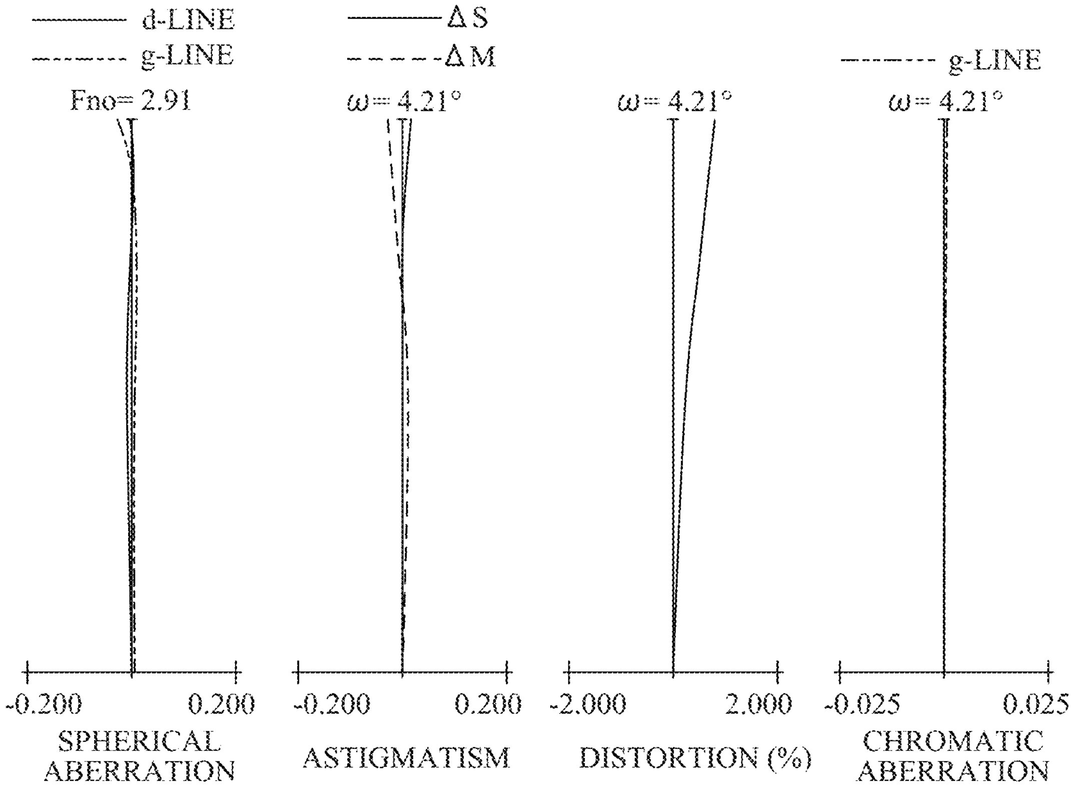
FIG. 10A illustrates an aberration diagram of the optical system according to Example 5 in an in-focus state at infinity.
Figure 10B:
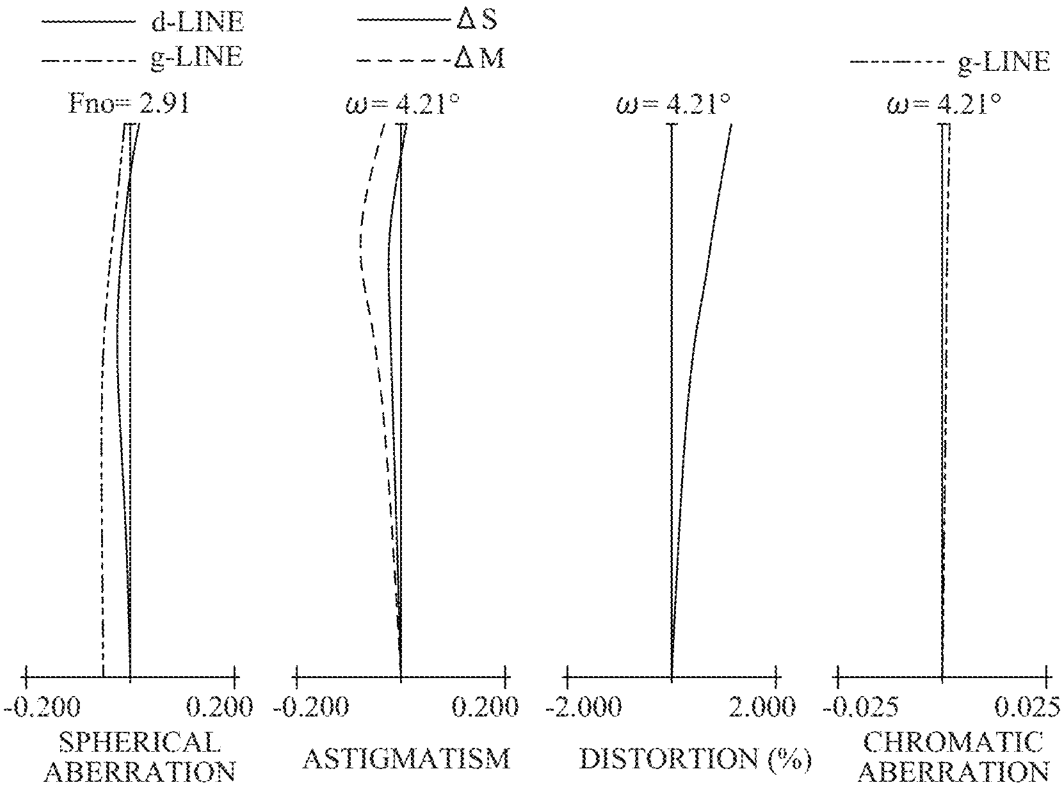
FIG. 10B illustrates an aberration diagram of the optical system according to Example 5 in an in-focus state at a close distance.

An optical system according to Example 5 illustrated in FIG. 9 includes an intermediate group Lm disposed on the image side of an aperture stop SP. The intermediate group Lm includes, in order from the object side to the image side, a focus lens unit Lf1 with negative refractive power, a positive lens that does not move during focusing, and a focus lens unit Lf2 with negative refractive power. During focusing from infinity to a close distance, the focus lens units Lf1 and Lf2 move toward the image side so that a distance between them increases.

An object-side lens subunit Lfa of the front lens unit Lf includes a single positive lens whose object-side surface is aspheric.

An image stabilizing lens unit ISf, which is a lens subunit including the third to fifth lenses counted from the object side in the rear lens unit Lr, shifts relative to the optical axis for optical image stabilization.

Example 6

Figure 6A:
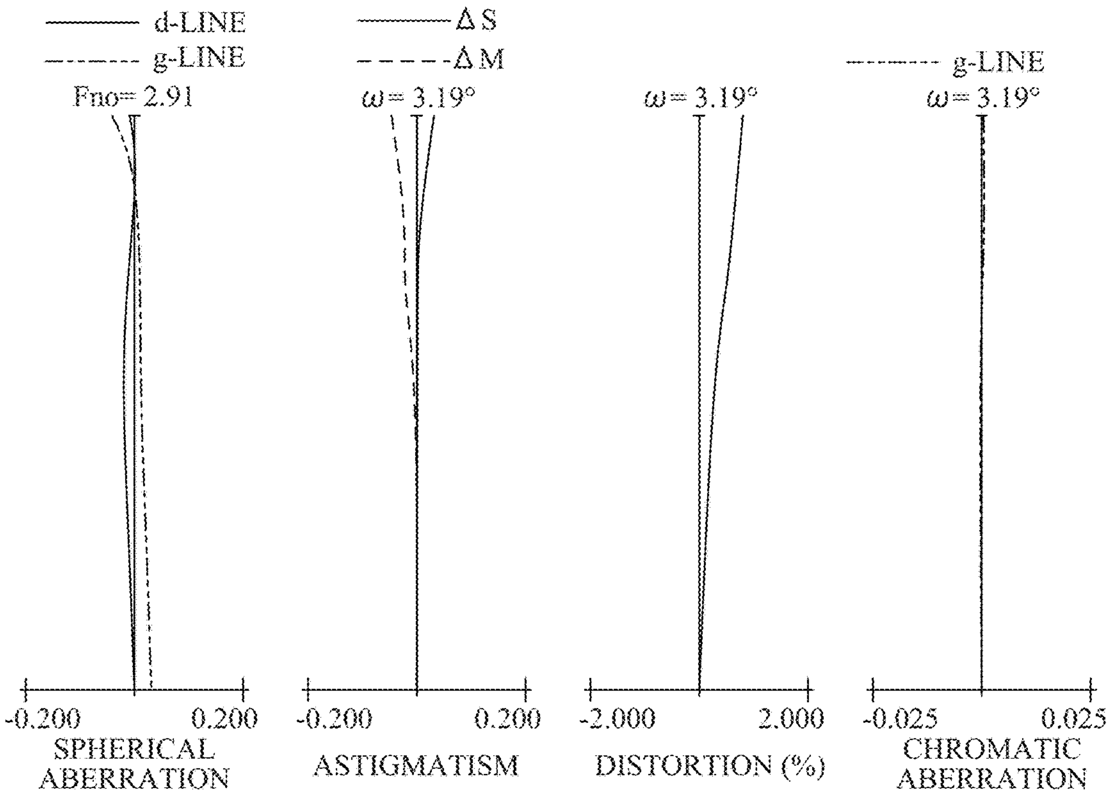
FIG. 6A illustrates an aberration diagram of the optical system according to Example 3 in an in-focus state at infinity.
Figure 6B:
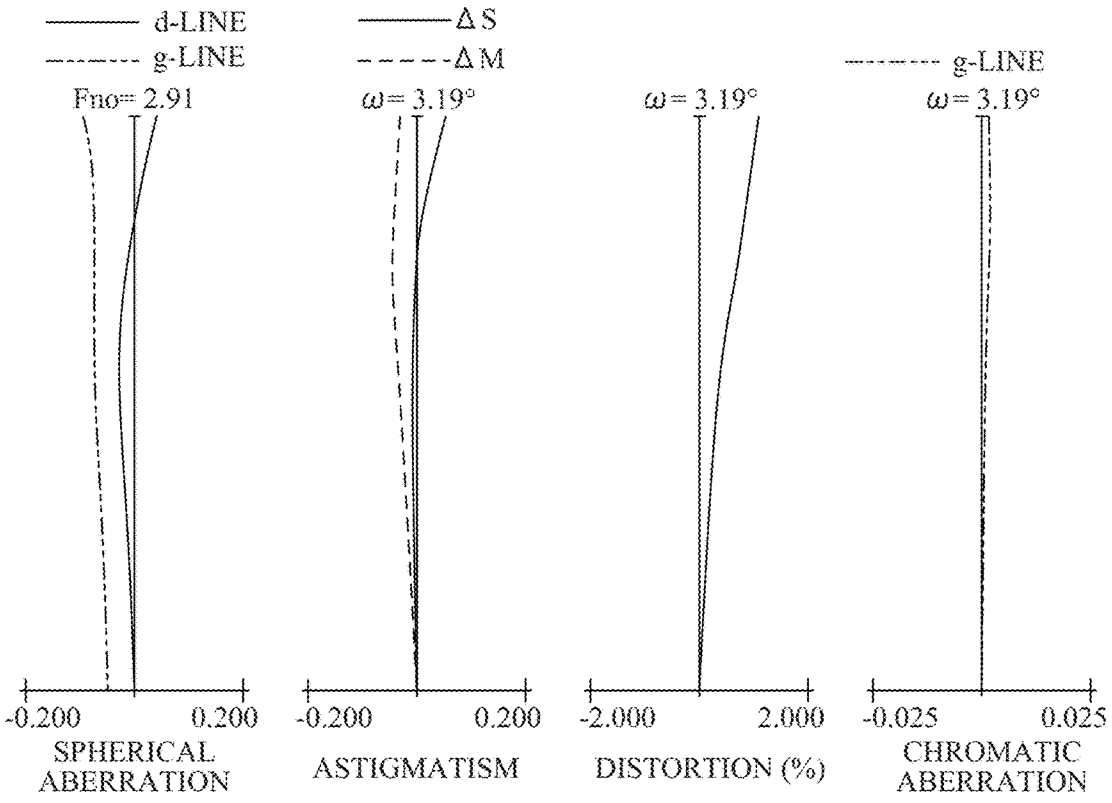
FIG. 6B illustrates an aberration diagram of the optical system according to Example 3 in an in-focus state at a close distance.
Figure 11:
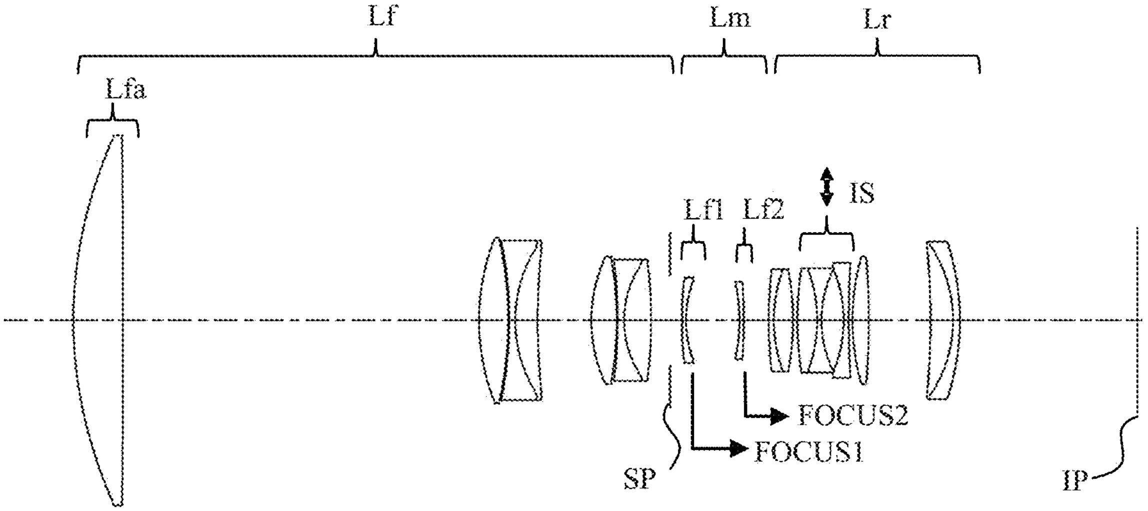
FIG. 11 illustrates a sectional view of an optical system according to Example 6.
Figure 12A:
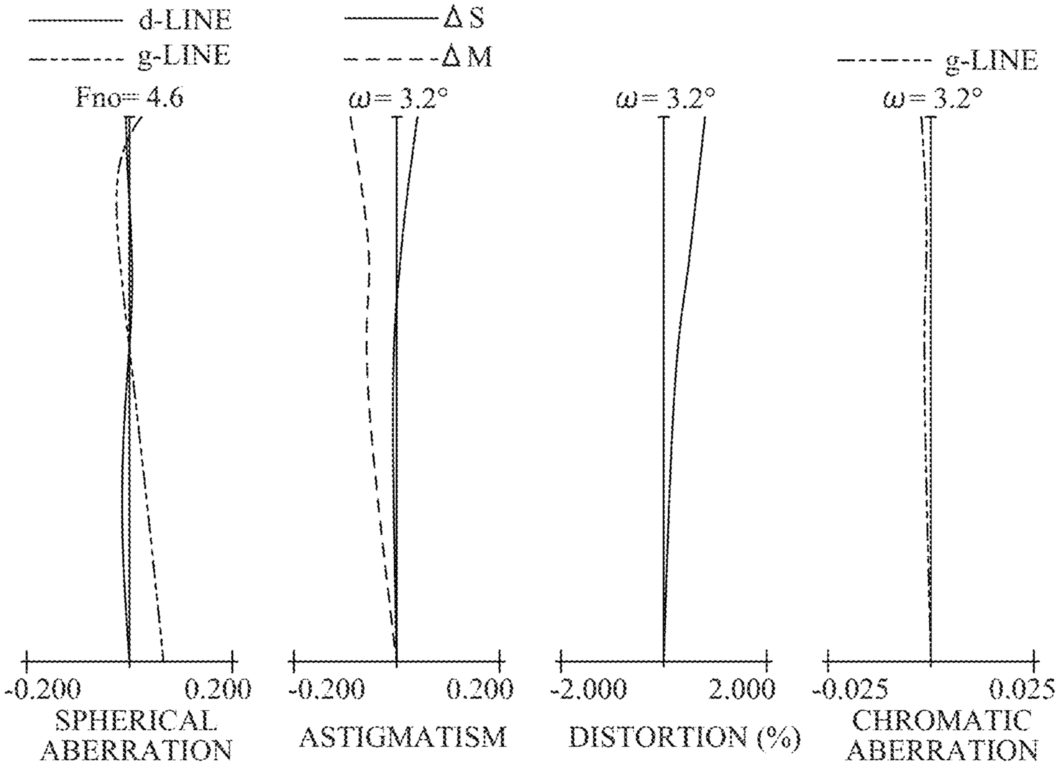
FIG. 12A illustrates an aberration diagram of the optical system according to Example 6 in an in-focus state at infinity.
Figure 12B:
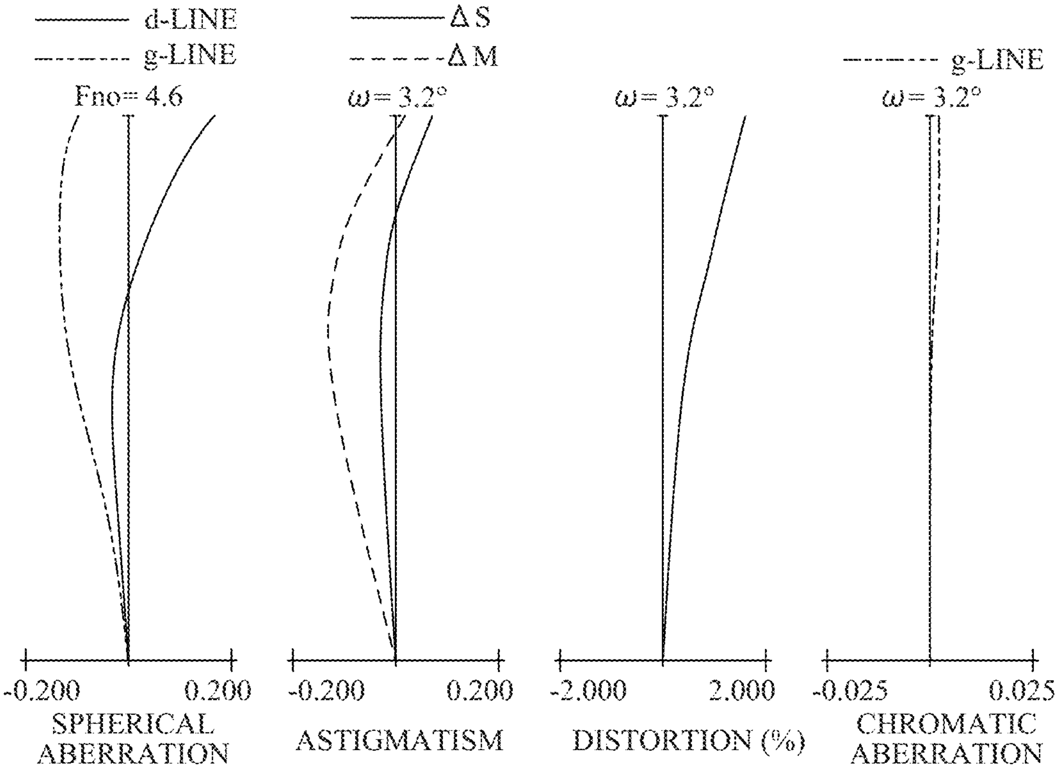
FIG. 12B illustrates an aberration diagram of the optical system according to Example 6 in an in-focus state at a close distance.

An optical system according to Example 6 illustrated in FIG. 11 includes an intermediate group Lm disposed on the image side of an aperture stop SP. The intermediate group Lm includes two adjacent focus lens units Lf1 and Lf2, each of which has negative refractive power. During focusing from infinity to a close distance, the focus lens units Lf1 and Lf2 move toward the image side as illustrated by arrows in FIG. 6 so that a distance is reduced.

An object-side lens subunit Lfa in the front lens unit Lf includes a single positive lens whose object-side and image-side surfaces are aspheric.

In a rear lens unit Lr, an image stabilizing lens unit ISf, which is a lens subunit including the third to fifth lenses counted from the object side, shifts relative to the optical axis for optical image stabilization.

A description will now be given of numerical examples 1 to 6 corresponding to Examples 1 to 6, respectively. In each numerical example, a surface number i indicates the order of the surface counted from the object side. r represents a radius of curvature (mm) of an i-th surface from the object side, d represents a lens thickness or air gap (mm) on the optical axis between i-th and (i+1)-th surfaces, and nd is a refractive index for the d-line of an optical material between i-th and (i+1)-th surfaces. νd is an Abbe number based on the d-line of the optical material between i-th and (i+1)-th surfaces. The Abbe number based on the d-line is expressed as:

$$\nu d=(Nd-1)/(NF-NC)$$

where Nd, NF, and NC are refractive indices for the d-line (587.6 nm), F-line (486.1 nm), and C-line (656.3 nm) in the Fraunhofer line.

In each numerical example, d, focal length (mm), F-number, and half angle of view (*) are all values in an in-focus state at infinity. BF represents back focus (mm). Back focus is a distance on the optical axis from a lens surface closest to the image plane (final surface) of the optical system to the paraxial image surface expressed in air equivalent length. An overall lens length is a distance on the optical axis from a lens surface closest to an object of the optical system to the final surface plus the back focus, and corresponds to the overall optical length OTL in inequality (2).

An asterisk "*" next to a surface number means that the surface has an aspherical shape. The aspherical shape is expressed as follows:

$$x=(h^2/R)/\left[1+\{1-(1+k)(h/R)^2\}^{1/2}\right]+A4\times h^4+A6\times h^6+A8\times h^8+A10\times h^{10}+A12\times h^{12}$$

where x is a displacement amount from a surface vertex in the optical axis direction, h is a height from the optical axis in a direction perpendicular to the optical axis, R is a paraxial radius of curvature, k is a conic constant, and A4, A6, A8, A10, and A12 are aspheric coefficients of each order. "e+XX" in the conic constant and aspheric coefficient means "$\times 10^{\pm XX}$".

Table 1 summarizes values of inequalities (1) to (10) in numerical examples. The optical systems according to numerical examples satisfy all of inequalities (1) to (10).

FIGS. 2A, 4A, 6A, 8A, 10A and 12A illustrate longitudinal aberrations (spherical aberration, astigmatism, distortion and chromatic aberration) of the optical systems according to numerical examples 1 to 6 in an in-focus state at infinity, respectively. FIGS. 2B, 4B, 6B, 8B, 10B and 12B illustrate longitudinal aberrations of the optical systems according to numerical examples 1 to 6 in an in-focus state at a close distance, respectively.

In the spherical aberration diagram, Fno indicates the F-number. A solid line indicates a spherical aberration amount for the d-line, and an alternate long and two short dashes line indicates a spherical aberration amount for the g-line (with a wavelength of 435.8 nm). In the astigmatism diagram, a solid line ΔS indicates an astigmatism amount on a sagittal image plane, and a dashed line ΔM indicates an astigmatism amount on a meridional image plane. The distortion diagram illustrates a distortion amount for the d-line. The chromatic aberration diagram illustrates a lateral chromatic aberration amount for the g-line. ω is a half angle of view) (°).

NUMERICAL EXAMPLE 1
UNIT: mm

SURFACE DATA

| Surface No. | r | d | nd | vd |
|---|---|---|---|---|
| 1 | 361.590 | 8.96 | 1.48749 | 70.2 |
| 2 | −23384.147 | 0.30 | | |
| 3 | 165.569 | 12.81 | 1.43387 | 95.1 |
| 4 | 622.689 | 132.44 | | |
| 5 | 87.354 | 12.05 | 1.43875 | 94.7 |
| 6 | −239.145 | 2.50 | 1.80610 | 33.3 |
| 7 | 57.954 | 0.18 | | |
| 8 | 56.866 | 12.48 | 1.43387 | 95.1 |
| 9 | −360.152 | 0.20 | | |
| 10 | 76.054 | 7.94 | 1.43387 | 95.1 |
| 11 | 814.525 | 2.12 | | |
| 12 | −268.908 | 2.00 | 1.61340 | 44.3 |
| 13 | 59.417 | 10.11 | 1.66382 | 27.4 |
| 14 | −194.105 | 4.41 | | |
| 15 (SP) | ∞ | (Variable) | | |
| 16 | 25372.899 | 1.70 | 1.59522 | 67.7 |
| 17 | 71.961 | (Variable) | | |
| 18 | 119.836 | 1.70 | 1.59522 | 67.7 |
| 19 | 58.499 | (Variable) | | |
| 20 | 196.399 | 1.50 | 1.98612 | 16.5 |
| 21 | 116.011 | 3.12 | 1.73800 | 32.3 |
| 22 | −606.051 | 2.33 | | |
| 23 | −179.127 | 3.48 | 1.80000 | 29.8 |
| 24 | −60.919 | 1.50 | 1.57144 | 71.6 |
| 25 | 86.488 | 1.47 | | |
| 26 | 855.808 | 1.50 | 1.80400 | 46.5 |
| 27 | 119.682 | 7.35 | | |
| 28 | −42.017 | 2.00 | 1.49700 | 81.5 |
| 29 | −49.197 | 2.00 | | |
| 30 | 146.161 | 6.69 | 1.85026 | 32.3 |
| 31 | −56.569 | 1.60 | 1.98612 | 16.5 |
| 32 | −95.361 | 56.03 | | |
| 33 | −3569.656 | 2.00 | 1.72825 | 28.5 |
| 34 | ∞ | (Variable) | | |
| Image Plane | ∞ | | | |

VARIOUS DATA

| | |
|---|---|
| Focal Length | 387.98 |
| Fno | 2.91 |
| Half Angle of View(°) | 3.19 |
| Image Height | 21.64 |
| Overall Lens Length | 372.01 |
| BF | 38.28 |

(OBJECT DISTANCE: INFINITY)

| | |
|---|---|
| d15 | 3.44 |
| d17 | 5.07 |
| d19 | 20.74 |
| d34 | 38.28 |

(OBJECT DISTANCE: −2.5 m)

| | |
|---|---|
| d15 | 18.74 |
| d17 | 5.34 |
| d19 | 5.17 |
| d34 | 38.28 |

LENS UNIT DATA

| Lens Unit | Starting Surface | Focal Length |
|---|---|---|
| 1 | 1 | 172.37 |
| 2 | 16 | −121.24 |
| 3 | 18 | −194.02 |
| 4 | 20 | 207.60 |

NUMERICAL EXAMPLE 2
UNIT: mm

SURFACE DATA

| Surface No. | r | d | nd | vd |
|---|---|---|---|---|
| 1 | 361.590 | 8.96 | 1.48749 | 70.2 |
| 2 | −23384.147 | 0.30 | | |
| 3 | 165.569 | 12.81 | 1.43387 | 95.1 |
| 4 | 622.689 | 132.44 | | |
| 5 | 87.354 | 12.05 | 1.43875 | 94.7 |
| 6 | −239.145 | 2.50 | 1.80610 | 33.3 |
| 7 | 57.954 | 0.18 | | |
| 8 | 56.866 | 12.48 | 1.43387 | 95.1 |
| 9 | −360.152 | 0.20 | | |
| 10 | 76.054 | 7.94 | 1.43387 | 95.1 |
| 11 | 814.525 | 2.12 | | |
| 12 | −268.908 | 2.00 | 1.61340 | 44.3 |
| 13 | 59.417 | 10.11 | 1.66382 | 27.4 |
| 14 | −194.105 | 4.41 | | |
| 15 (SP) | ∞ | (Variable) | | |
| 16 | 25372.899 | 1.70 | 1.59522 | 67.7 |

-continued

NUMERICAL EXAMPLE 2
UNIT: mm

| | | | | |
|---|---|---|---|---|
| 17 | 71.961 | (Variable) | | |
| 18 | 119.836 | 1.70 | 1.59522 | 67.7 |
| 19 | 58.499 | (Variable) | | |
| 20 | 196.399 | 1.50 | 1.98612 | 16.5 |
| 21 | 116.011 | 3.12 | 1.73800 | 32.3 |
| 22 | −606.051 | 2.33 | | |
| 23 | −179.127 | 3.48 | 1.80000 | 29.8 |
| 24 | −60.919 | 1.50 | 1.57144 | 71.6 |
| 25 | 86.488 | 1.47 | | |
| 26 | 855.808 | 1.50 | 1.80400 | 46.5 |
| 27 | 119.682 | 7.35 | | |
| 28 | −42.017 | 2.00 | 1.49700 | 81.5 |
| 29 | −49.197 | 2.00 | | |
| 30 | 146.161 | 6.69 | 1.85026 | 32.3 |
| 31 | −56.569 | 1.60 | 1.98612 | 16.5 |
| 32 | −95.361 | 2.48 | | |
| 33 | 22.976 | 8.53 | 1.48749 | 70.2 |
| 34 | 167.264 | 0.17 | | |
| 35 | 51.442 | 3.74 | 1.57501 | 41.5 |
| 36 | 121.848 | 1.00 | 1.90525 | 35.0 |
| 37 | 27.926 | 10.16 | | |
| 38 | −672.196 | 0.95 | 1.72916 | 54.7 |
| 39 | 14.961 | 14.43 | 1.59270 | 35.3 |
| 40 | −15.436 | 0.95 | 1.81600 | 46.6 |
| 41 | 75.686 | 0.65 | | |
| 42 | 31.712 | 9.96 | 1.60342 | 38.0 |
| 43 | −22.105 | 1.05 | 2.00100 | 29.1 |
| 44 | −102.267 | 1.99 | | |
| 45 | −3569.656 | 2.00 | 1.72825 | 28.5 |
| 46 | ∞ | (Variable) | | |
| Image Plane | ∞ | | | |

-continued

NUMERICAL EXAMPLE 2
UNIT: mm

VARIOUS DATA

| | |
|---|---|
| Focal Length | 543.19 |
| Fno | 4.12 |
| Half Angle of View (°) | 2.28 |
| Image Height | 21.64 |
| Overall Lens Length | 372.05 |
| BF | 38.30 |

(OBJECT DISTANCE: INFINITY)

| | |
|---|---|
| d15 | 3.44 |
| d17 | 5.07 |
| d19 | 20.74 |
| d46 | 38.30 |

(OBJECT DISTANCE: −2.5 m)

| | |
|---|---|
| d15 | 18.74 |
| d17 | 5.34 |
| d19 | 5.17 |
| d46 | 38.30 |

LENS UNIT DATA

| Lens Unit | Starting Surface | Focal Length |
|---|---|---|
| 1 | 1 | 172.37 |
| 2 | 16 | −121.24 |
| 3 | 18 | −194.02 |
| 4 | 20 | −186.53 |

NUMERICAL EXAMPLE 3
UNIT: mm

SURFACE DATA

| Surface No. | r | d | nd | vd |
|---|---|---|---|---|
| 1* | 248.151 | 14.18 | 1.59349 | 67.0 |
| 2 | −824.380 | 150.33 | | |
| 3 | 60.269 | 12.75 | 1.43387 | 95.1 |
| 4 | −18936.039 | 0.20 | | |
| 5 | 285.198 | 1.80 | 1.77047 | 29.7 |
| 6 | 43.002 | 11.78 | 1.43875 | 94.7 |
| 7 | 442.854 | 9.59 | | |
| 8 | 86.585 | 5.94 | 1.43387 | 95.1 |
| 9 | −482.598 | 0.86 | | |
| 10 | −208.293 | 2.00 | 1.67300 | 38.1 |
| 11 | 34.591 | 10.05 | 1.71338 | 26.0 |
| 12 | −413.575 | 4.41 | | |
| 13 (SP) | ∞ | (Variable) | | |
| 14 | 202.953 | 1.50 | 1.88300 | 40.8 |
| 15 | 78.905 | (Variable) | | |
| 16 | 176.134 | 1.40 | 1.80400 | 46.6 |
| 17 | 45.961 | (Variable) | | |
| 18 | 178.052 | 1.50 | 1.98612 | 16.5 |
| 19 | 56.107 | 4.65 | 1.85478 | 24.8 |
| 20 | −148.672 | 1.00 | | |
| 21 | 194.147 | 5.31 | 1.59270 | 35.3 |
| 22 | −46.710 | 1.50 | 1.53775 | 74.7 |
| 23 | 35.018 | 6.15 | | |
| 24 | −54.008 | 1.20 | 1.49700 | 81.5 |
| 25 | 156.911 | 1.06 | | |
| 26 | 69.234 | 4.44 | 1.73037 | 32.2 |
| 27 | −280.157 | 18.01 | | |
| 28* | 96.272 | 7.70 | 1.73037 | 32.2 |
| 29 | −73.401 | 1.60 | 1.98612 | 16.5 |
| 30 | −238.443 | (Variable) | | |
| Image Plane | ∞ | | | |

-continued

NUMERICAL EXAMPLE 3
UNIT: mm

ASPHERIC DATA

1st Surface
K = 0.00000e+00 A 4 = −1.52594e−08 A 6 = −3.05283e−13 A 8 = 1.96693e−17
A10 = −4.31090e−21 A12 = 3.32591e−25 A14 = −2.92022e−30
28th Surface
K = 0.00000e+00 A 4 = 2.91447e−07 A 6 = 2.37934e−10 A 8 = −2.19986e−13
A10 = 1.97198e−16

VARIOUS DATA

| | |
|---|---|
| Focal Length | 387.76 |
| Fno | 2.91 |
| Half Angle of View (°) | 3.19 |
| Image Height | 21.64 |
| Overall Lens Length | 350.09 |
| BF | 37.64 |

(OBJECT DISTANCE: INFINITY)

| | |
|---|---|
| d13 | 2.83 |
| d15 | 4.48 |
| d17 | 24.22 |
| d30 | 37.64 |

(OBJECT DISTANCE: −2.5 m)

| | |
|---|---|
| d13 | 16.77 |
| d15 | 3.01 |
| d17 | 11.75 |
| d30 | 37.64 |

LENS UNIT DATA

| Lens Unit | Starting Surface | Focal Length |
|---|---|---|
| 1 | 1 | 162.66 |
| 2 | 14 | −147.04 |
| 3 | 16 | −77.72 |
| 4 | 18 | 129.95 |

NUMERICAL EXAMPLE 4
UNIT: mm

SURFACE DATA

| Surface No. | r | d | nd | νd |
|---|---|---|---|---|
| 1 | 214.815 | 8.20 | 1.48749 | 70.2 |
| 2 | 2858.165 | 0.30 | | |
| 3 | 131.160 | 8.11 | 1.43387 | 95.1 |
| 4 | 296.511 | 108.02 | | |
| 5 | 59.061 | 9.22 | 1.43875 | 94.7 |
| 6 | −834.931 | 2.50 | 1.80610 | 33.3 |
| 7 | 40.320 | 0.07 | | |
| 8 | 39.698 | 9.97 | 1.43387 | 95.1 |
| 9 | −1108.152 | 0.20 | | |
| 10 | 55.009 | 5.51 | 1.43387 | 95.1 |
| 11 | 281.223 | 1.75 | | |
| 12 | −248.383 | 2.00 | 1.61340 | 44.3 |
| 13 | 48.570 | 7.01 | 1.66382 | 27.4 |
| 14 | −259.456 | (Variable) | | |
| 15 | −267.876 | 1.77 | 1.84961 | 24.1 |
| 16 | −164.795 | (Variable) | | |
| 17 (SP) | ∞ | (Variable) | | |
| 18 | 144.973 | 1.00 | 1.62580 | 64.2 |
| 19 | 33.451 | (Variable) | | |
| 20 | −2938.396 | 1.00 | 1.67744 | 59.1 |
| 21 | 52.065 | (Variable) | | |
| 22 | 47.624 | 1.50 | 1.98612 | 16.5 |
| 23 | 34.404 | 3.72 | 1.73800 | 32.3 |
| 24 | 521.716 | 2.19 | | |

-continued

NUMERICAL EXAMPLE 4
UNIT: mm

| | | | | |
|---|---|---|---|---|
| 25 | −193.942 | 2.79 | 1.80000 | 29.8 |
| 26 | −54.832 | 1.50 | 1.57144 | 71.6 |
| 27 | 45.569 | 2.28 | | |
| 28 | −272.462 | 1.50 | 1.80400 | 46.5 |
| 29 | 348.000 | 2.61 | | |
| 30 | 73.446 | 2.00 | 1.49700 | 81.5 |
| 31 | 243.232 | 2.00 | | |
| 32 | 105.943 | 4.54 | 1.85026 | 32.3 |
| 33 | −97.352 | 1.60 | 1.98612 | 16.5 |
| 34 | −264.722 | 14.92 | | |
| 35 | 227.342 | 2.00 | 1.84499 | 25.4 |
| 36 | ∞ | (Variable) | | |
| Image Plane | ∞ | | | |

VARIOUS DATA

| | |
|---|---|
| Focal Length | 293.93 |
| Fno | 2.91 |
| Half Angle of View ( ) | 4.21 |
| Image Height | 21.64 |
| Overall Lens Length | 280.10 |
| BF | 37.92 |

(OBJECT DISTANCE: INFINITY)

| | |
|---|---|
| d14 | 9.58 |
| d16 | 2.56 |
| d17 | 3.65 |

-continued

| NUMERICAL EXAMPLE 4 UNIT: mm | |
|---|---|
| d19 | 5.45 |
| d21 | 9.19 |
| d36 | 37.92 |
| (OBJECT DISTANCE: −2.5 m) | |
| d14 | 8.72 |
| d16 | 3.41 |
| d17 | 12.44 |
| d19 | 2.91 |

-continued

NUMERICAL EXAMPLE 4
UNIT: mm

| | |
|---|---|
| d21 | 2.94 |
| d36 | 37.92 |

LENS UNIT DATA

| Lens Unit | Starting Surface | Focal Length |
|---|---|---|
| 1 | 1 | 146.25 |
| 2 | 15 | 500.10 |
| 3 | 17 | ∞ |
| 4 | 18 | −69.73 |
| 5 | 20 | −75.51 |
| 6 | 22 | 79.53 |

NUMERICAL EXAMPLE 5
UNIT: mm

SURFACE DATA

| Surface No. | r | d | nd | νd |
|---|---|---|---|---|
| 1* | 181.780 | 11.26 | 1.59349 | 67.0 |
| 2 | −792.802 | 104.82 | | |
| 3 | 63.151 | 10.08 | 1.43387 | 95.1 |
| 4 | −435.065 | 1.41 | | |
| 5 | 1995.530 | 1.80 | 1.77047 | 29.7 |
| 6 | 44.839 | 9.19 | 1.43875 | 94.7 |
| 7 | −1540.104 | 0.19 | | |
| 8 | 120.168 | 4.99 | 1.43387 | 95.1 |
| 9 | −289.132 | 0.79 | | |
| 10 | −166.118 | 2.00 | 1.67300 | 38.1 |
| 11 | 41.233 | 6.87 | 1.71338 | 26.0 |
| 12 | 440.009 | 4.41 | | |
| 13 (SP) | ∞ | (Variable) | | |
| 14 | 460.813 | 1.50 | 1.57501 | 41.5 |
| 15 | 58.113 | (Variable) | | |
| 16 | 67.515 | 4.34 | 1.90525 | 35.0 |
| 17 | −322.866 | (Variable) | | |
| 18 | 345.625 | 1.00 | 1.72916 | 54.7 |
| 19 | 37.967 | (Variable) | | |
| 20 | 123.777 | 1.50 | 1.98612 | 16.5 |
| 21 | 90.228 | 2.69 | 1.75700 | 47.8 |
| 22 | −1251.283 | 1.00 | | |
| 23 | 151.227 | 4.12 | 1.59270 | 35.3 |
| 24 | −71.341 | 1.50 | 1.53775 | 74.7 |
| 25 | 40.675 | 4.39 | | |
| 26 | −67.989 | 1.20 | 1.49700 | 81.5 |
| 27 | 74.403 | 1.53 | | |
| 28 | 54.472 | 3.33 | 1.73037 | 32.2 |
| 29 | 223.241 | 20.60 | | |
| 30* | 84.345 | 8.46 | 1.73037 | 32.2 |
| 31 | −66.019 | 1.60 | 1.98612 | 16.5 |
| 32 | −174.334 | (Variable) | | |
| Image Plane | ∞ | | | |

ASPHERIC DATA

1st Surface
K = 0.00000e+00 A 4 = −2.98031e−08 A 6 = −9.51752e−13 A 8 = 2.44412e−17
A10 = −1.21721e−20 A12 = 3.32864e−25 A14 = 2.70525e−28
30th Surface
K = 0.00000e+00 A 4 = −4.54498e−08 A 6 = 1.16669e−10 A 8 = −3.19123e−13
A10 = 1.36316e−16

VARIOUS DATA

| | |
|---|---|
| Focal Length | 293.91 |
| Fno | 2.91 |
| Half Angle of View (°) | 4.21 |
| Image Height | 21.64 |

-continued

| NUMERICAL EXAMPLE 5<br>UNIT: mm | |
|---|---|
| Overall Lens Length | 285.03 |
| BF | 38.50 |
| (OBJECT DISTANCE: INFINITY) | |
| d13 | 3.10 |
| d15 | 10.65 |
| d17 | 2.93 |
| d19 | 13.28 |
| d32 | 38.50 |
| (OBJECT DISTANCE: −2.5 m) | |
| d13 | 10.10 |
| d15 | 3.65 |
| d17 | 11.50 |
| d19 | 4.71 |
| d32 | 38.50 |

LENS UNIT DATA

| Lens Unit | Starting Surface | Focal Length |
|---|---|---|
| 1 | 1 | 184.74 |
| 2 | 14 | −115.81 |
| 3 | 16 | 62.01 |
| 4 | 18 | −58.58 |
| 5 | 20 | 163.52 |

NUMERICAL EXAMPLE 6
UNIT: mm

SURFACE DATA

| Surface No. | r | d | nd | νd |
|---|---|---|---|---|
| 1* | 99.578 | 11.66 | 1.59349 | 67.0 |
| 2* | −11291.333 | 83.80 | | |
| 3 | 52.203 | 6.93 | 1.43387 | 95.1 |
| 4 | −84.555 | 0.20 | | |
| 5 | −93.456 | 1.40 | 1.77047 | 29.7 |
| 6 | 32.199 | 5.28 | 1.43875 | 94.7 |
| 7 | 163.008 | 12.64 | | |
| 8 | 35.431 | 5.99 | 1.43387 | 95.1 |
| 9 | −78.480 | 0.20 | | |
| 10 | −118.489 | 1.50 | 1.83481 | 42.7 |
| 11 | 23.489 | 6.42 | 1.71338 | 26.0 |
| 12 | −101.816 | 4.41 | | |
| 13 (SP) | ∞ | (Variable) | | |
| 14 | 82.241 | 1.00 | 1.88300 | 40.8 |
| 15 | 27.039 | (Variable) | | |
| 16 | −40.745 | 1.00 | 1.77250 | 49.6 |
| 17 | −156.365 | (Variable) | | |
| 18 | 111.289 | 1.20 | 1.98612 | 16.5 |
| 19 | 34.955 | 4.51 | 1.85478 | 24.8 |
| 20 | −62.278 | 1.00 | | |
| 21 | 79.965 | 4.67 | 1.59270 | 35.3 |
| 22 | −34.368 | 1.00 | 1.53775 | 74.7 |
| 23 | 26.859 | 5.23 | | |
| 24 | −31.176 | 1.20 | 1.49700 | 81.5 |
| 25 | 238.025 | 0.87 | | |
| 26 | 53.994 | 3.85 | 1.77047 | 29.7 |
| 27 | −178.142 | 14.51 | | |
| 28* | −190.776 | 5.30 | 1.73037 | 32.2 |
| 29 | −31.556 | 1.60 | 1.98612 | 16.5 |
| 30 | −58.924 | (Variable) | | |
| Image Plane | ∞ | | | |

ASPHERIC DATA

1st Surface
K = 0.00000e+00 A 4 = −8.08909e−08 A 6 = −4.40701e−12 A 8 = −2.96813e−15

-continued

| NUMERICAL EXAMPLE 6<br>UNIT: mm |
|---|
| A10 = −1.45875e−18 A12 = 3.22851e−25 A14 = −9.74246e−27 |
| 2nd Surface |
| K = 0.00000e+00 A 4 = −3.06763e−08 A 6 = 7.18030e−12 A 8 = −6.27380e−15 |
| 28th Surface |
| K = 0.00000e+00 A 4 = −1.16736e−07 A 6 = −1.17777e−09 A 8 = 3.18931e−12 |
| A10 = −4.92448e−15 |

VARIOUS DATA

| | |
|---|---|
| Focal Length | 387.52 |
| Fno | 4.60 |
| Half Angle of View (°) | 3.20 |
| Image Height | 21.64 |
| Overall Lens Length | 250.40 |
| BF | 41.80 |

(OBJECT DISTANCE: INFINITY)

| | |
|---|---|
| d13 | 2.76 |
| d15 | 12.57 |
| d17 | 5.91 |
| d30 | 41.80 |

(OBJECT DISTANCE: −2.5 m)

| | |
|---|---|
| d13 | 11.85 |
| d15 | 5.19 |
| d17 | 4.20 |
| d30 | 41.80 |

LENS UNIT DATA

| Lens Unit | Starting Surface | Focal Length |
|---|---|---|
| 1 | 1 | 133.36 |
| 2 | 14 | −46.01 |
| 3 | 16 | −71.60 |
| 4 | 18 | 75.71 |

TABLE 1

| | | Numerical Example | | | | | |
|---|---|---|---|---|---|---|---|
| | Inequality | 1 | 2 | 3 | 4 | 5 | 6 |
| (1) | 0.10 ≤ Bab_min/Fno ≤ 0.95 | 0.381 | 0.527 | 0.902 | 0.245 | 0.692 | 0.251 |
| (2) | 0.45 ≤ OTL/f ≤ 1.20 | 0.959 | 0.685 | 0.903 | 0.953 | 0.970 | 0.646 |
| (3) | 0.06 ≤ fab_min/f ≤ 0.60 | 0.313 | 0.223 | 0.200 | 0.237 | 0.199 | 0.119 |
| (4) | 0.10 ≤ fab_max/f ≤ 2.00 | 0.500 | 0.357 | 0.379 | 1.701 | 0.394 | 0.185 |
| (5) | 0.15 ≤ Dmax/OTL ≤ 0.60 | 0.356 | 0.356 | 0.378 | 0.473 | 0.465 | 0.529 |
| (6) | 0.20 ≤ f1/f ≤ 0.80 | 0.444 | 0.317 | 0.419 | 0.498 | 0.629 | 0.344 |
| (7) | 0.01 ≤ Df_max/OTL ≤ 0.15 | 0.032 | 0.032 | 0.029 | 0.040 | 0.083 | 0.069 |
| (8) | 1.30 ≤ BF/IH ≤ 5.00 | 1.770 | 1.770 | 1.740 | 1.753 | 1.779 | 1.932 |
| (9) | 0.50 ≤ Bab_max/Fno ≤ 2.00 | 1.216 | 1.683 | 0.909 | 1.195 | 1.452 | 1.583 |
| (10) | 0.20 ≤ f1a/f ≤ 1.00 | 0.781 | 0.558 | 0.833 | 0.858 | 0.851 | 0.429 |
| | Fno | 2.910 | 4.120 | 2.910 | 2.910 | 2.910 | 4.600 |
| | OTL | 372.014 | 372.047 | 350.093 | 280.099 | 285.031 | 250.404 |
| | f | 387.980 | 543.192 | 387.764 | 293.930 | 293.913 | 387.523 |
| | fab_min | 121.245 | 121.245 | 77.721 | 69.728 | 58.575 | 46.011 |
| | fab_max | 194.025 | 194.025 | 147.035 | 500.101 | 115.807 | 71.601 |
| | Dmax | 132.440 | 132.440 | 132.440 | 132.440 | 132.440 | 132.440 |
| | f1 | 172.372 | 172.372 | 162.664 | 146.251 | 184.742 | 133.361 |
| | Df_max | 11.908 | 11.908 | 10.203 | 11.096 | 23.523 | 17.329 |
| | BF | 38.285 | 38.298 | 37.640 | 37.921 | 38.497 | 41.797 |
| | IH | 21.635 | 21.635 | 21.635 | 21.635 | 21.635 | 21.635 |
| | f1a | 302.952 | 302.952 | 322.972 | 252.159 | 250.237 | 166.380 |
| | Bab_max | 3.537 | 6.934 | 2.645 | 3.476 | 4.226 | 7.282 |
| | Bab_min | 1.109 | 2.173 | 2.624 | 0.714 | 2.013 | 1.154 |
| | B1 | −3.537 | −6.934 | −2.645 | 0.714 | −2.013 | −7.282 |
| | B2 | −1.109 | −2.173 | −2.624 | −3.476 | −4.226 | −1.154 |
| | B3 | — | — | — | −1.215 | — | — |

Image Pickup Apparatus

Figure 13:
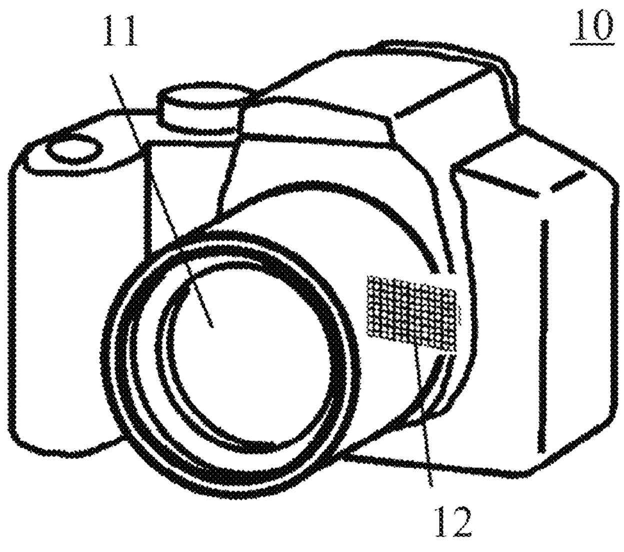
FIG. 13 is a schematic diagram of an image pickup apparatus having the optical system according to any one of Examples 1 to 6.

FIG. 13 illustrates the configuration of a digital still camera (image pickup apparatus) that uses the optical system according to any one of Examples 1 to 6 as an imaging optical system. Reference numeral 10 denotes a camera body, and reference numeral 11 denotes the imaging optical system that includes one of the optical systems according to Examples 1 to 6. Reference numeral 12 denotes an image sensor that is built into the camera body, includes a photoelectric conversion element such as a CCD sensor or a CMOS sensor, and photoelectrically converts an optical image formed by the imaging optical system 11 (i.e., captures an object image through the imaging optical system 11).

The camera body 10 may be a single-lens reflex camera with a quick-turn mirror, or a mirrorless camera without a quick-turn mirror. The camera body 10 may also be of a lens-interchangeable type or a lens-integrated type.

Thus, applying the optical system according to any one of the above examples to an image pickup apparatus such as a digital still camera can provide an image pickup apparatus with a small optical system.

While the disclosure has described example embodiments, it is to be understood that the disclosure is not limited to the example embodiments. The scope of the following claims is to be accorded the broadest interpretation so as to encompass all such modifications and equivalent structures and functions.

Each example can provide an optical system that has a reduced size and weight, a long focal length, capability of high-speed and highly accurate focusing, and various well-corrected aberrations.

This application claims priority to Japanese Patent Application No. 2024-019976, which was filed on Feb. 14, 2024, and which is hereby incorporated by reference herein in its entirety.

What is claimed is:

1. An optical system comprising, in order from an object side to an image side:

a front lens unit having positive refractive power;

an intermediate group; and a rear lens unit, wherein a distance between adjacent lens units changes during focusing, wherein the front lens unit includes a maximum air gap in the optical system, wherein the front lens unit and the rear lens unit do not move for focusing, wherein the intermediate group includes two or more focus lens units that move in different loci for focusing, and wherein the following inequalities are satisfied:

$$0.10 \leq \mathrm{Bab\_min}/Fno \leq 0.95$$

$$0.45 \leq OTL/f \leq 1.20$$

where Bab_min is a smallest absolute value of focus sensitivity of the two or more focus lens units, Fno is a full aperture F-number of the optical system, OTL is a length on an optical axis from a lens surface closest to an object of the optical system to an image plane, and f is a focal length of the optical system.

2. The optical system according to claim 1, wherein the following inequality is satisfied:

$$0.06 \leq \mathrm{fab\_min}/f \leq 0.60$$

where fab_min is a smallest absolute value of focal lengths of the two or more focus lens units.

3. The optical system according to claim 1, wherein the following inequality is satisfied:

$$0.10 \leq \mathrm{fab\_max}/f \leq 2.00$$

where fab_max is a largest absolute value of focal lengths of the two or more focus lens units.

4. The optical system according to claim 1, wherein the following inequality is satisfied:

$$0.15 \leq D\mathrm{max}/OTL \leq 0.60$$

where Dmax is a length of the maximum air gap on an optical axis.

5. The optical system according to claim 1, wherein the following inequality is satisfied:

$$0.2 \leq f1/f \leq 0.8$$

where f1 is a focal length of the front lens unit.

6. The optical system according to claim 1, wherein the optical system includes an aperture stop configured to determine an F-number, and wherein two of the two or more focus lens units are disposed on the image side of the aperture stop.

7. The optical system according to claim 1, wherein the optical system includes an aperture stop configured to determine an F-number, and wherein the following inequality is satisfied:

$$0.01 \leq |\mathrm{Df\_max}|/OTL \leq 0.15$$

where Df_max is a distance on an optical axis from the aperture stop to an aperture-stop-side lens surface of the focus lens unit that is farthest from the aperture stop among the two or more focus lens units.

8. The optical system according to claim 1, wherein the following inequality is satisfied:

$$1.3 \leq BF/IH \leq 5.0$$

where BF is an air-equivalent distance on an optical axis from a lens surface closest to the image plane of the optical system to the image plane, and IH is a maximum image height.

9. The optical system according to claim 1, wherein the following inequality is satisfied:

$$0.5 \leq \mathrm{Bab\_max}/Fno \leq 2.0$$

where Bab_max is a largest absolute value of the focus sensitivity of each of the two or more focus lens units.

10. The optical system according to claim 1, wherein the following inequality is satisfied:

$$0.2 \le f1a/f \le 1.0$$

where f1a is a focal length of an object-side lens subunit among lens subunits disposed on the object side and the image side in the front lens unit via the maximum air gap.

11. The optical system according to claim 10, wherein the object-side lens subunit includes a single positive lens.

12. The optical system according to claim 1, wherein each of the two or more focus lens units has negative refractive power.

13. The optical system according to claim 1, wherein the intermediate group includes two adjacent focus lens units each having negative refractive power, and wherein the two focus lens units move toward the image side during focusing from infinity to a close distance.

14. The optical system according to claim 1, wherein the intermediate group includes a focus lens unit with positive refractive power, an aperture stop, and two focus lens units each having negative refractive power, wherein the focus lens unit with positive refractive power moves toward the object side during focusing from infinity to a close distance, and wherein the two focus lens units each having negative refractive power move toward the image side during focusing from infinity to a close distance.

15. The optical system according to claim 1, wherein at least a part of the rear lens unit moves relative to an optical axis for optical image stabilization.

16. An image pickup apparatus comprising:

an optical system; and an image sensor configured to capture an object image through the optical system, wherein the optical system includes, in order from an object side to an image side:

a front lens unit having positive refractive power;

an intermediate group; and a rear lens unit, wherein a distance between adjacent lens units changes during focusing, wherein the front lens unit includes a maximum air gap in the optical system, wherein the front lens unit and the rear lens unit do not move for focusing, wherein the intermediate group includes two or more focus lens units that move in different loci for focusing, and wherein the following inequalities are satisfied:

$$0.10 \le \text{Bab\_min}/Fno \le 0.95$$

$$0.45 \le OTL/f \le 1.20$$

where Bab_min is a smallest absolute value of focus sensitivity of the two or more focus lens units, Fno is a full aperture F-number of the optical system, OTL is a length on an optical axis from a lens surface closest to an object of the optical system to an image plane, and f is a focal length of the optical system.

* * * * *